United States Patent [19]

Franklin et al.

[11] Patent Number: 5,355,784
[45] Date of Patent: Oct. 18, 1994

[54] JUICE EXTRACTORS

[75] Inventors: Eric Franklin, Crawfordsville, Ind.; Brent Markee; Harold Kawaguchi, both of Seattle, Wash.; Bong-Sool Kim, Pusan, Rep. of Korea; Robert G. Harrison, Poulsbo, Wash.

[73] Assignee: Trillium Health Products, Inc., Seattle, Wash.

[21] Appl. No.: 811,572

[22] Filed: Dec. 20, 1991

[51] Int. Cl.⁵ .............................................. A23N 1/02
[52] U.S. Cl. ........................................ 99/492; 99/511; 241/37.5; 241/92; 241/199.12; 366/314; 366/601
[58] Field of Search .......................... 99/495, 509–513; 210/360.1, 380.1, 374, 369; 241/37.5, 282.1, 282.2, 199.12; 366/314, 197, 200, 601; 494/36, 43, 56, 58

[56] References Cited

U.S. PATENT DOCUMENTS

| | | |
|---|---|---|
| 1,962,856 | 6/1934 | Benson ................................. 99/513 |
| 2,011,211 | 8/1935 | Brown . |
| 2,180,877 | 11/1939 | Lorenzen . |
| 2,206,204 | 7/1940 | Richli . |
| 2,440,425 | 4/1948 | Williams ............................... 99/513 |
| 2,481,010 | 9/1949 | Gundelfinger ....................... 99/512 |
| 2,527,695 | 10/1950 | Bennett . |
| 2,757,696 | 8/1956 | Billard . |
| 2,901,015 | 8/1959 | Swenson et al. . |
| 2,934,116 | 4/1960 | Dannenmann . |
| 3,186,458 | 6/1965 | Takei et al. .......................... 99/512 |
| 3,370,626 | 2/1968 | Weier . |
| 3,892,365 | 7/1975 | Verdun .............................. 241/282.1 |
| 4,345,517 | 8/1982 | Arao et al. . |
| 4,350,087 | 9/1982 | Ramirez ............................... 99/513 |
| 4,506,601 | 3/1985 | Ramirez et al. . |
| 4,572,445 | 2/1986 | Cristante . |
| 4,614,153 | 9/1986 | Kurome et al. . |
| 4,681,031 | 7/1987 | Austad . |
| 4,688,478 | 8/1987 | Williams ............................... 99/513 |
| 4,700,621 | 10/1987 | Elger . |
| 4,702,162 | 10/1987 | Sontheimer et al. ................. 99/495 |
| 4,716,823 | 1/1988 | Capdevila . |
| 4,741,482 | 5/1988 | Coggiola et al. .................. 241/37.5 |
| 4,840,119 | 6/1989 | Caldi . |
| 4,921,174 | 5/1990 | Okada et al. ....................... 366/601 |
| 5,065,672 | 11/1991 | Federighi, Sr. ..................... 99/623 |

FOREIGN PATENT DOCUMENTS

| | | |
|---|---|---|
| 8906106 | 7/1989 | PCT Int'l Appl. ................. 99/513 |
| 352798 | 4/1961 | Switzerland . |
| 368908 | 6/1963 | Switzerland . |
| 369262 | 6/1963 | Switzerland . |
| 1584898 | 8/1990 | U.S.S.R. .............................. 99/511 |

Primary Examiner—Timothy F. Simone
Attorney, Agent, or Firm—Hughes, Multer & Schacht

[57] ABSTRACT

Apparatus for extracting juice from produce such as fruits and vegetables. The extractor has a base which includes a housing and a motor with a vertically aligned drive shaft. A blade basket detachably mounted on and driven by the output shaft separates produce into pulp and juice, and a juice bowl surrounding the blade basket collects the juice. The juice bowl is mounted on the base of the apparatus such that rotation of the bowl in a first direction relative to the base locks the bowl to the base. Rotation of the juice bowl in the opposite direction out of the locked position lifts the bowl away from the base and uncouples the blade basket from the drive shaft. An interlock system keeps the motor from being turned on until the juice bowl is locked to the base and a cover is locked onto the juice bowl. Performance is enhanced by, inter alia: anti-splashing provisions and vibration absorbing components which isolate the motor and the motor driven components of the apparatus.

5 Claims, 16 Drawing Sheets

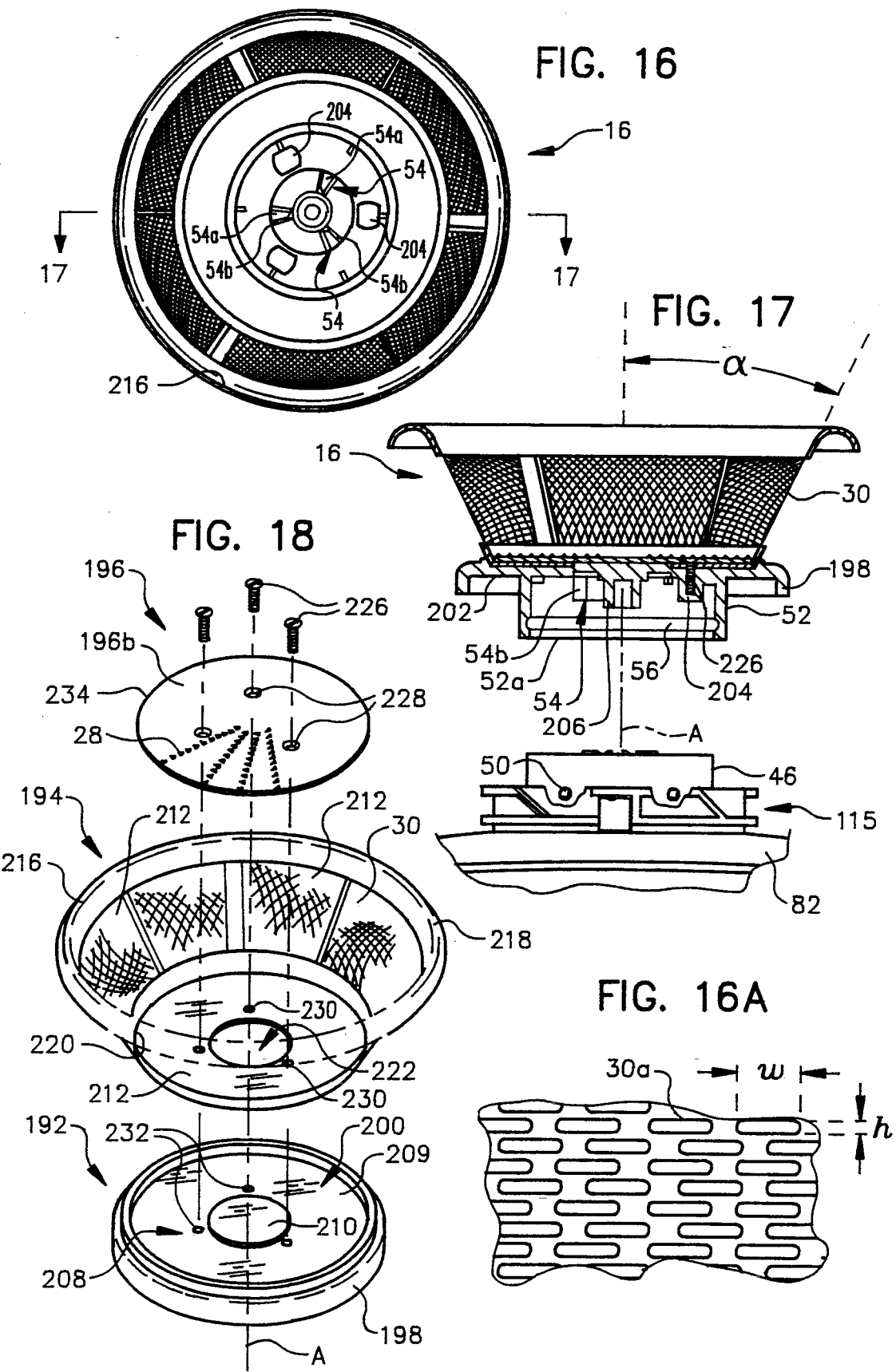

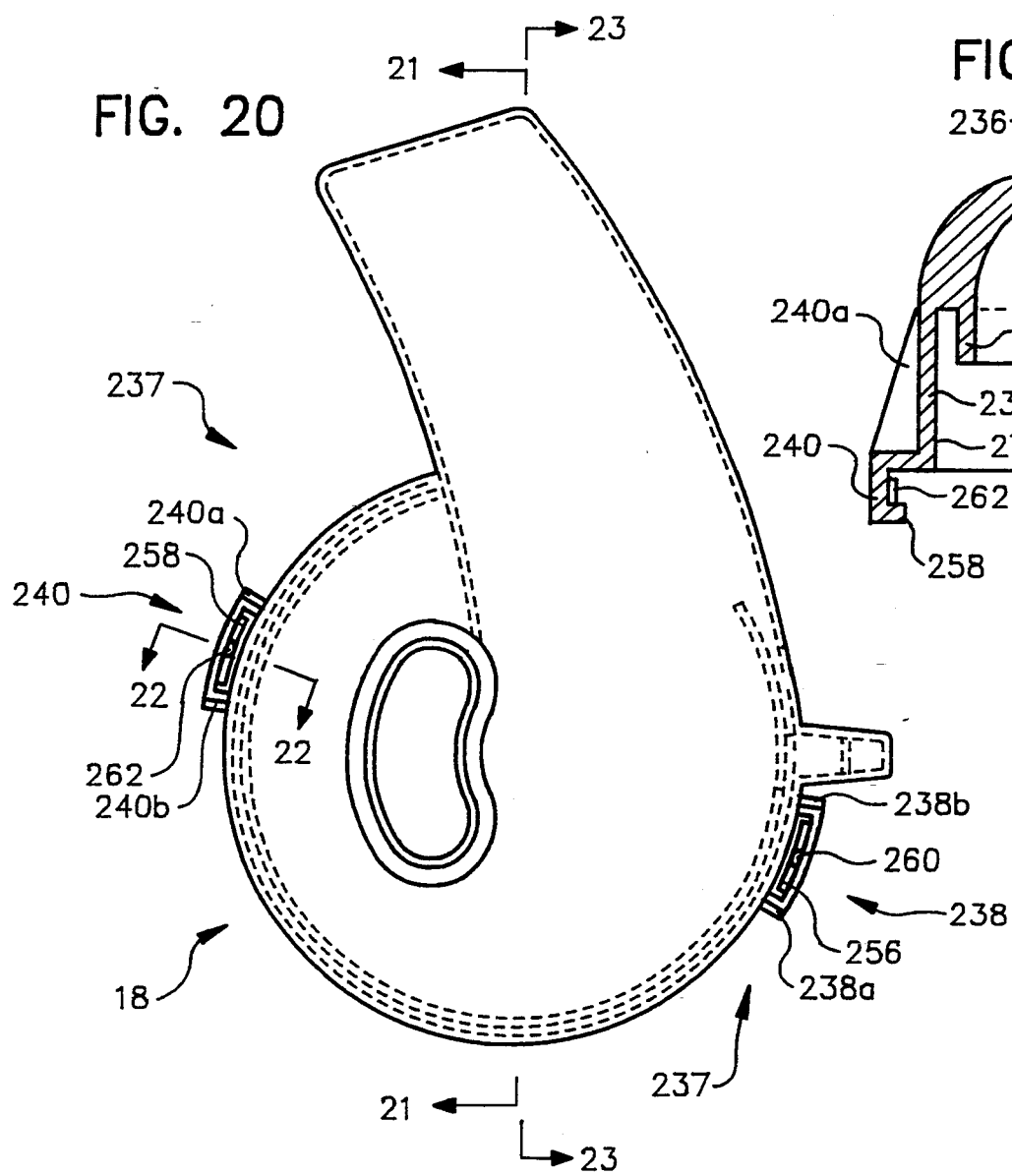
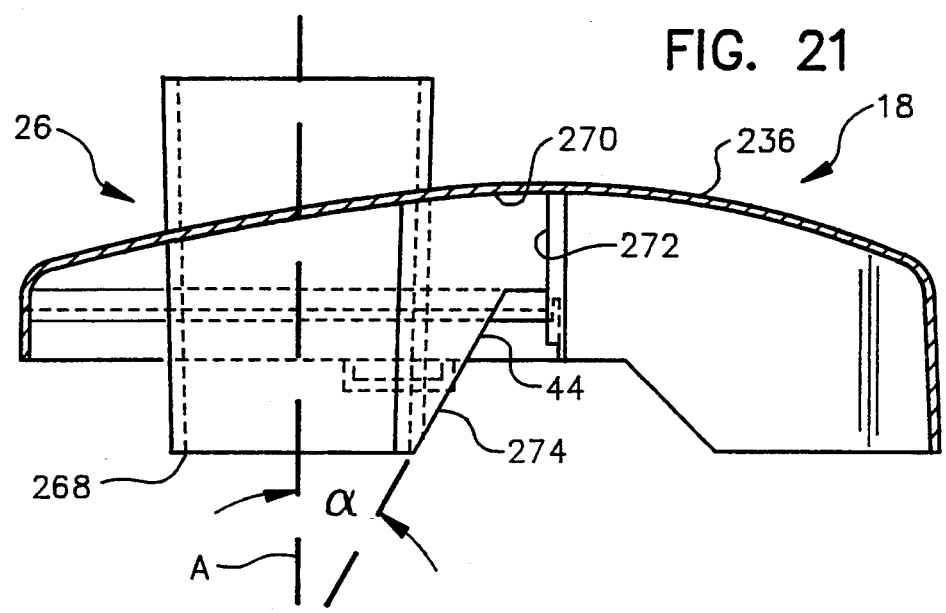

JUICE EXTRACTORS

TECHNICAL FIELD OF THE INVENTION

The present invention relates to novel, improved apparatus and methods for extracting juice from produce such as fruits and vegetables.

BACKGROUND OF THE INVENTION

Juice extractors commonly have a base housing a motor and controls therefor, a centrifugal type blade basket for comminuting the produce to release the juices, a filter for separating the produce into juice and pulp, a juice bowl in which the juice collects, and a lid for covering the juice bowl during operation.

Such juicers are subject to a variety of design considerations. It is generally desirable to: (a) maximize the amount of juice extracted from a given piece of produce, while (b) minimizing the amount of pulp in the juice. However, these goals must be obtained within parameters determined by manufacturing costs, ease of assembly, use and cleaning, and user safety.

Additionally, at least certain components of these juice extractors must be cleaned after each use. Current juicers can be difficult for certain members of the market, such as the elderly, to disassemble for cleaning. This is particularly true of the blade basket which, because it is located within the juice bowl, is often difficult to remove from the motor shaft.

Further, because the process of extracting juice from produce usually involves rapidly spinning blades, precautions must be taken to reduce the risk of injury caused by the user coming into contact with the moving blades. These precautions are usually in the form of an interlock switch system for energizing the motor that rotates the blades. Such switch systems must not unduly hinder the operation of the juice extractor or the user may attempt to bypass them; they should also be inexpensively implemented to allow the extractor to be sold at a reasonable price.

In order to keep the costs of manufacturing to a minimum, the juice bowl, which collects the juice and funnels it to the exterior of the juice extractor, should be as compact as possible. However, with such compact juice bowls, the spinning blade basket can cause juice to be propelled through the spout hole in the juice bowl and beyond the container designed to collect the juice. This causes a loss of juice and creates a mess in the working area.

It is also necessary that the vibration of the motor be damped or suppressed to prevent vibration of the extractor. Otherwise, this vibration may cause the extractor to walk or scoot off of the surface on which it is placed.

SUMMARY OF THE INVENTION

The foregoing and other drawbacks of heretofore available juicers are eliminated, in accord with the principles of the present invention, by juicer extractors which have: (a) a base which includes a housing and a motor; (b) a blade basket detachably coupled to the motor output shaft for separating the produce into pulp and juice when rotated; (c) a bowl surrounding a substantial portion of the blade basket for collecting the juice; and (e) an arrangement for so mounting the juice bowl on the housing of the juicer base that: (a) when the bowl is rotated in a first direction relative to the housing, the bowl is locked to the housing; and (b) when the bowl is rotated in the opposite direction, the bowl is unlocked and displaced away from the juicer motor drive shaft to detach the blade basket from the drive shaft.

Assembly of the blade basket and the juice bowl to the base of the juicer is facilitated by a motor output shaft-to-blade basket drive coupling which allows the blade basket and the output shaft to be rotated relative to each other to couple them together. Thereafter, complementary surfaces on cooperating elements of the coupling so contact each other when the motor output shaft is rotated that the drive hub imparts the rotation of the output shaft to the blade basket.

Another important feature of the present invention is an interlock which keeps the motor in the juicer base from being turned on unless the juice bowl is locked to the housing of the juicer base and a cooperating cover or lid is locked in place on the juice bowl. This keeps the operator's fingers and foreign objects away from the blade basket and insures that it and/or the juice bowl or cover are not thrown from the base due to improper attachment when the juicer is turned on. The interlock includes a switch which is wired in series with the juicer motor and an interlock switch actuator which is capable of closing the interlock switch only when the juice bowl and blade basket are correctly assembled to the juicer base and the cover of the juicer is correctly placed on and locked to the juice bowl.

The blade basket of the novel juicer disclosed herein has an array of knives or blades for shredding the comestible being juiced and an inverted, apertured, frustoconical screen through which the juice is expressed by centrifugal force as the blade basket rotates.

The juice bowl has an inner wall which keeps juice from splashing out of the bowl as it flows into the bowl from the screen of the blade basket. It also has a spout through which the juice flows to a pitcher or other container. A novel baffle arrangement keeps the juice from splashing as it flows into the spout from the juice collecting sump of the juice bowl.

Optimally, the angle $\delta$ between the blade basket screen and the axis about which it rotates is between 55 and 60 degrees. The apertures in that screen are preferably horizontally oriented and have a length of 1.894 to 1.895 mm and a width of 0.25 to 0.26 mm. The blade basket is preferably rotated at a speed of 6300 to 6400 rpm.

Associated with the blade basket screen is a scraper with an edge which parallels and lies adjacent the inner surface of the screen. This scraper moves excess pulp trapped on the screen upwardly and over the top edge of the screen to a vessel in which the pulp is collected.

Vibrations of the juicer motor and the blade basket are absorbed by a novel arrangement which supports the juicer motor in, but efficiently isolates it from, the housing of the juicer base. Vibration absorbing feet absorb additional mechanical energy and keep the juicer from walking across the surface on which it is supported.

Important objects, features, and advantages of the invention will be apparent to the reader from the foregoing and the appended claims and as the ensuing detailed description and discussion proceeds in conjunction with the accompanying drawings.

BRIEF DESCRIPTION OF THE DRAWING

FIG. 16 is a bottom view of the blade basket showing in detail the basket hub;

FIG. 16a is a fragmentary view depicting in detail the holes in a pulp and juice separating screen or filter of the blade basket;

FIG. 17 is an exploded view which depicts the assembly of the blade basket to the motor output shaft of the extractor; the blade basket is sectioned along line 17—17 of FIG. 16;

FIG. 18 is an exploded view of the blade basket;

FIG. 20 is a top view of the juice bowl lid;

FIG. 21 is a section through the juice bowl lid, taken along line 21—21 of FIG. 20;

FIG. 22 is a fragmentary section through the juice bowl lid taken along line 22—22 in FIG. 20 and presented to show how the lid is locked to the juice bowl;

FIG. 26a is a fragmentary, partially sectioned view depicting the attachment of the motor to one leg of the motor mounting system.

DETAILED DESCRIPTION OF THE INVENTION

Figure 19:
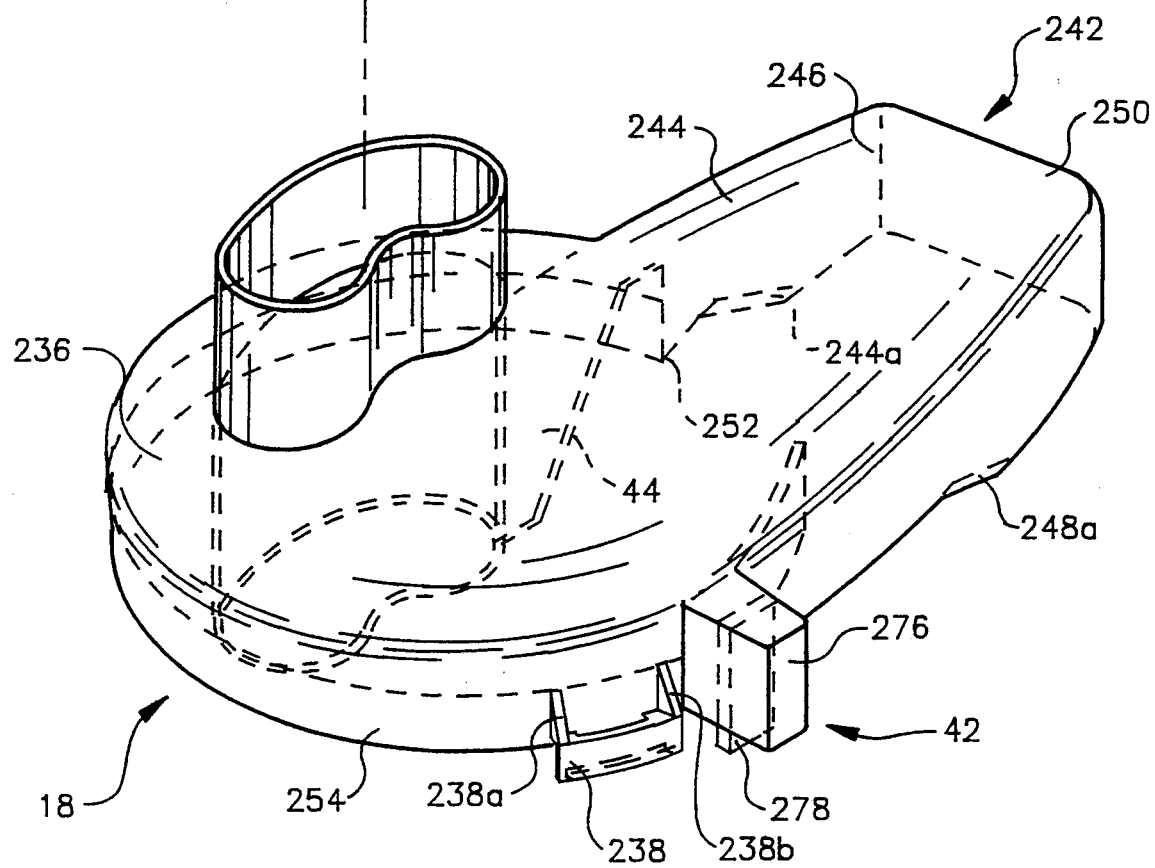
FIG. 19 is a perspective view of the juice bowl lid and a plunger employed to force produce into the blade basket.
Figure 23:
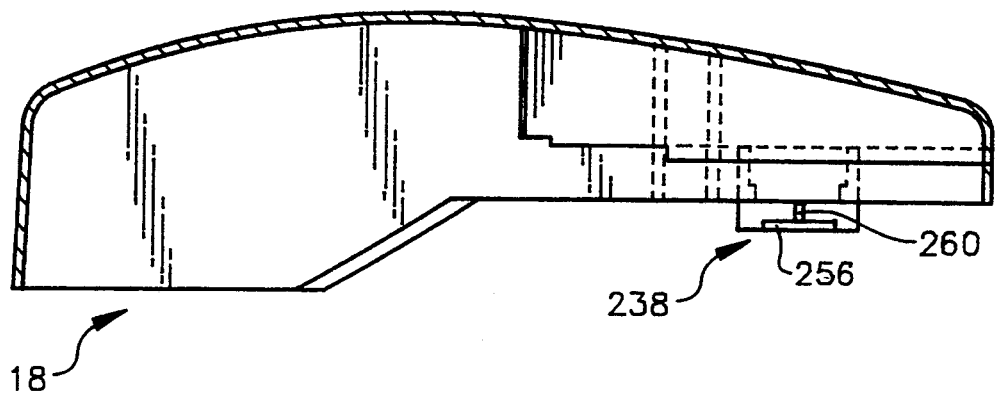
FIG. 23 is a section through the juice bowl taken along line 23—23 in FIG. 20.

Referring now to the drawing, FIGS. 1-5 depict a juice extractor 10 constructed in accord with, and embodying, the principles of the present invention. Juice extractor 10 has the following major components: (a) a base 12 (FIGS. 6-10); (b) a juice bowl 14 (FIGS. 11-14); (c) a blade basket 16 (FIGS. 16-18); (d) a juice bowl lid 18 (FIG. 19-23); and (c) a feed plunger 20 (FIG. 19).

For purposes of description, the terms "front and frontward" will be employed below to denote the portion of the juice extractor 10 that appears at the bottom left in FIG. 1; similarly, the terms "back", "backward", "left", "right", "inner", "outer", "top", "upper", and "bottom lower" denote the portions of juice extractor 10 that appear in the corresponding positions in that Figure. A drive axis extends along line A in FIG. 1.

Figure 1:
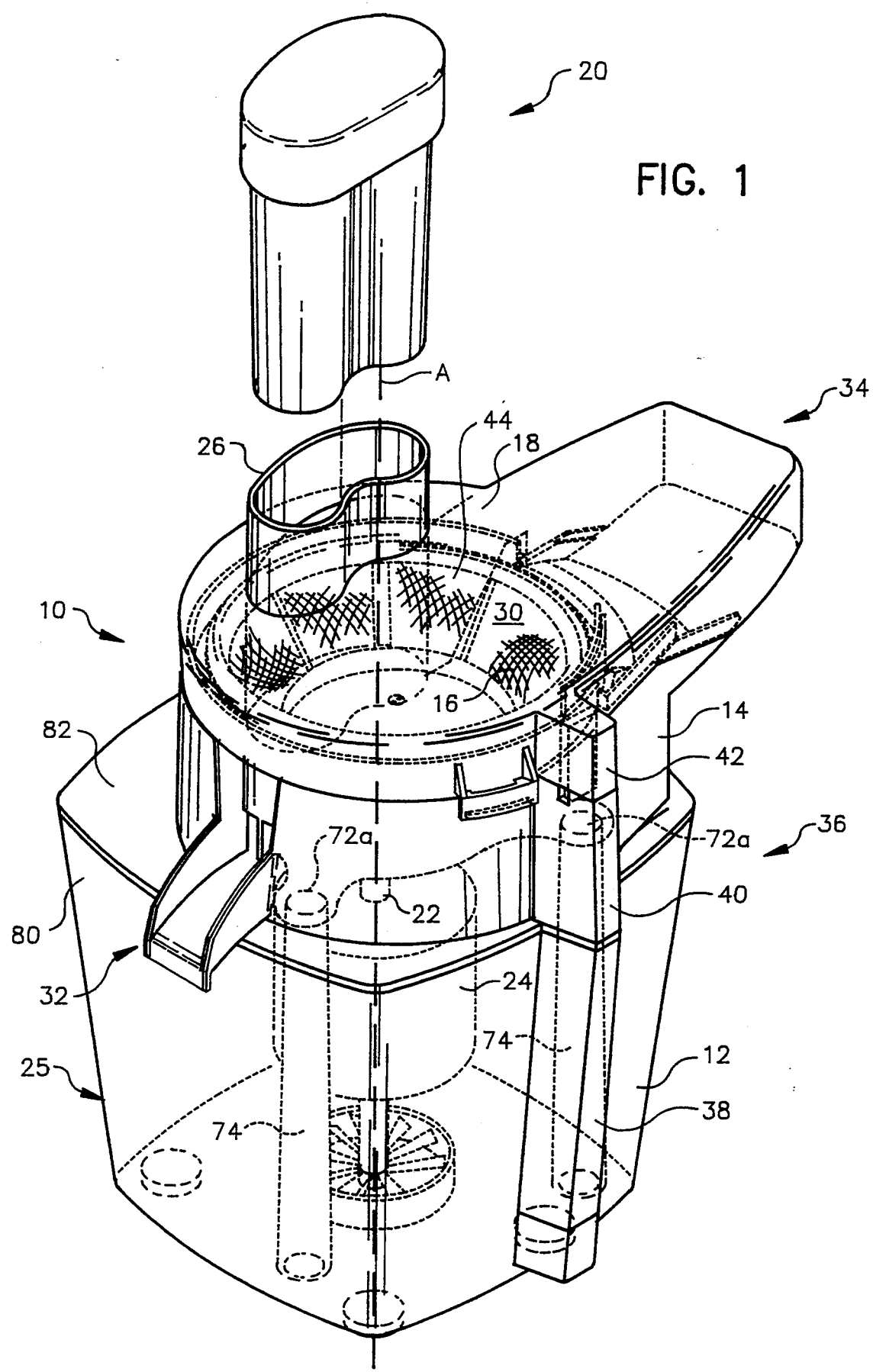
FIG. 1 is a perspective view of a juice extractor constructed in accordance with the present invention and having: a base housing a motor, a juice bowl, a blade basket, a lid, a plunger, and a motor mounting system schematically indicated by dashed lines.
Figure 3:
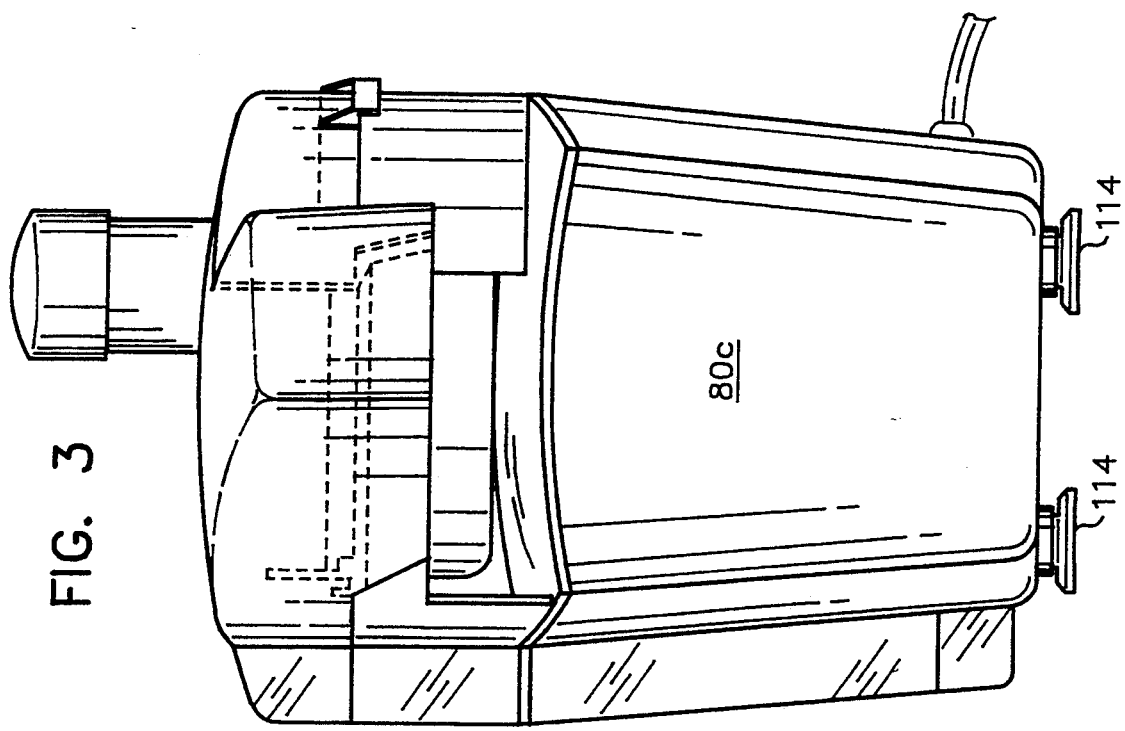
FIGS. 2-5 are front, rear, right side, and left side views of the juice extractor.
Figure 2:
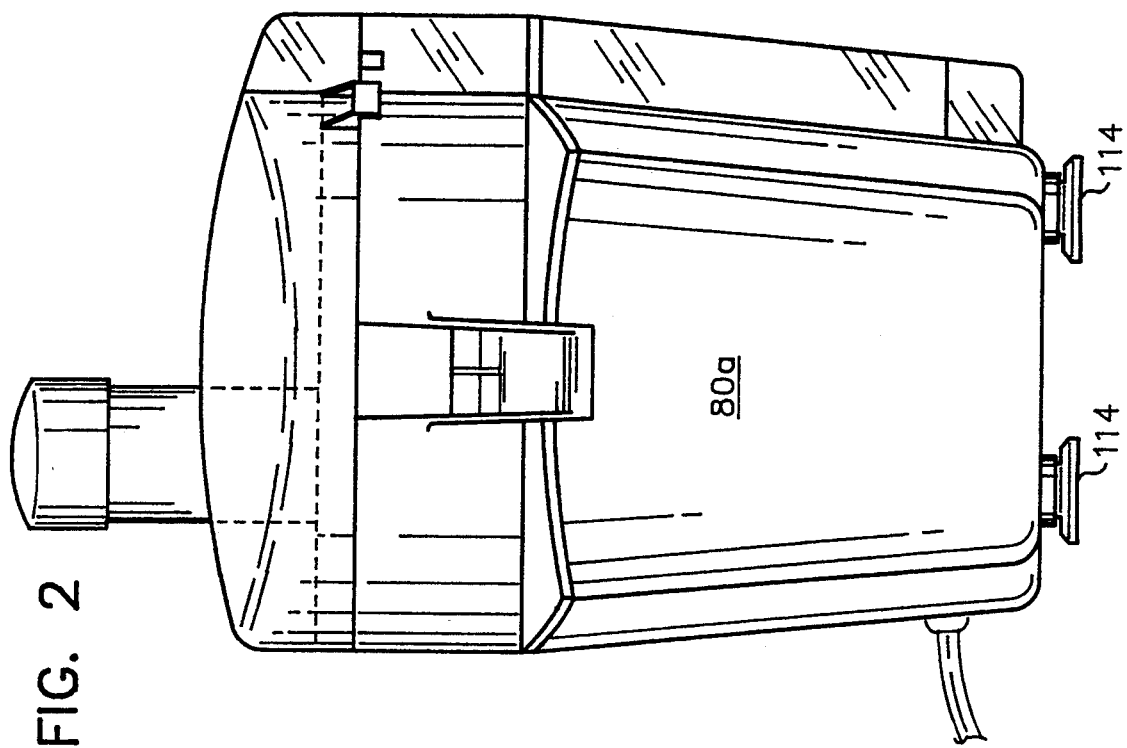
Figure 4:
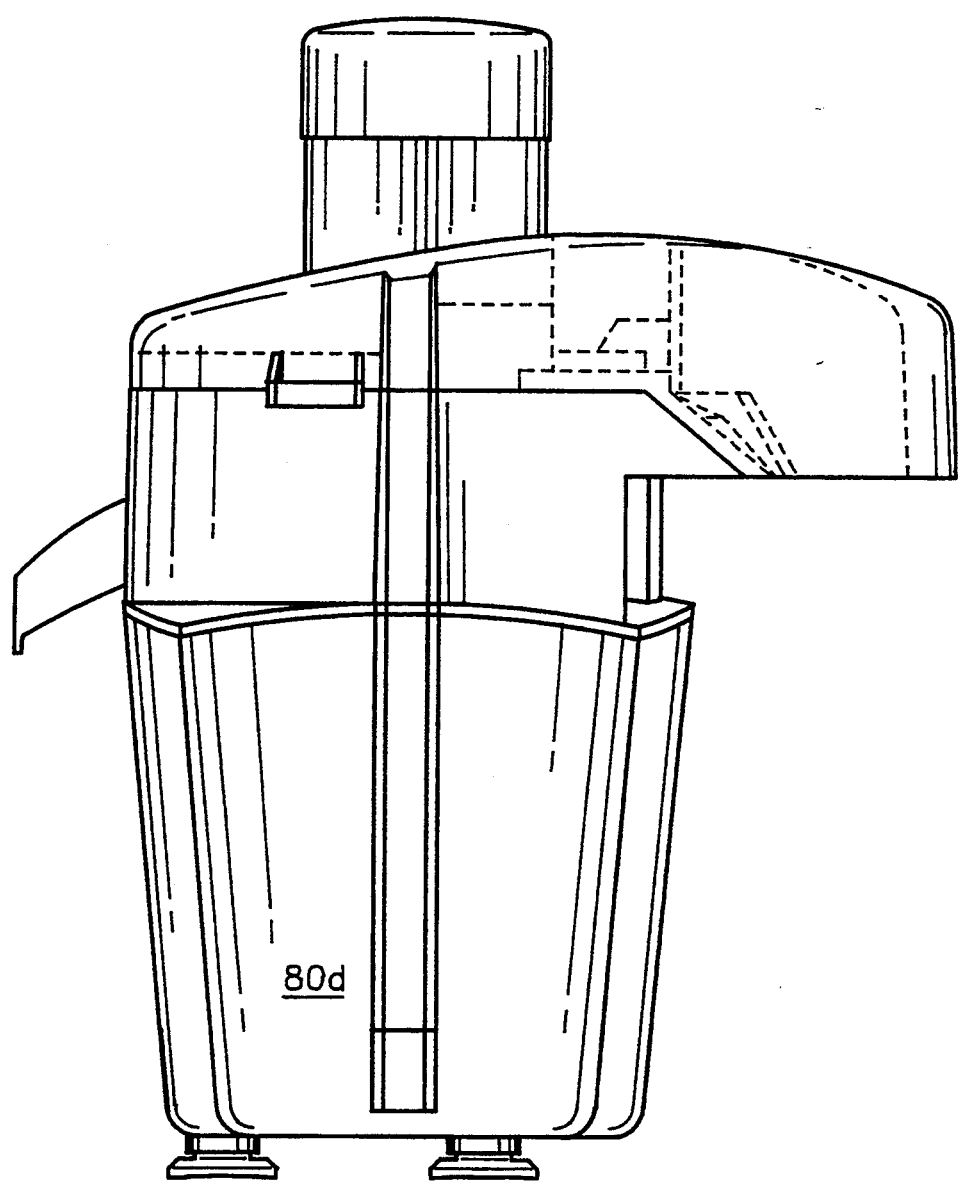
Figure 5:
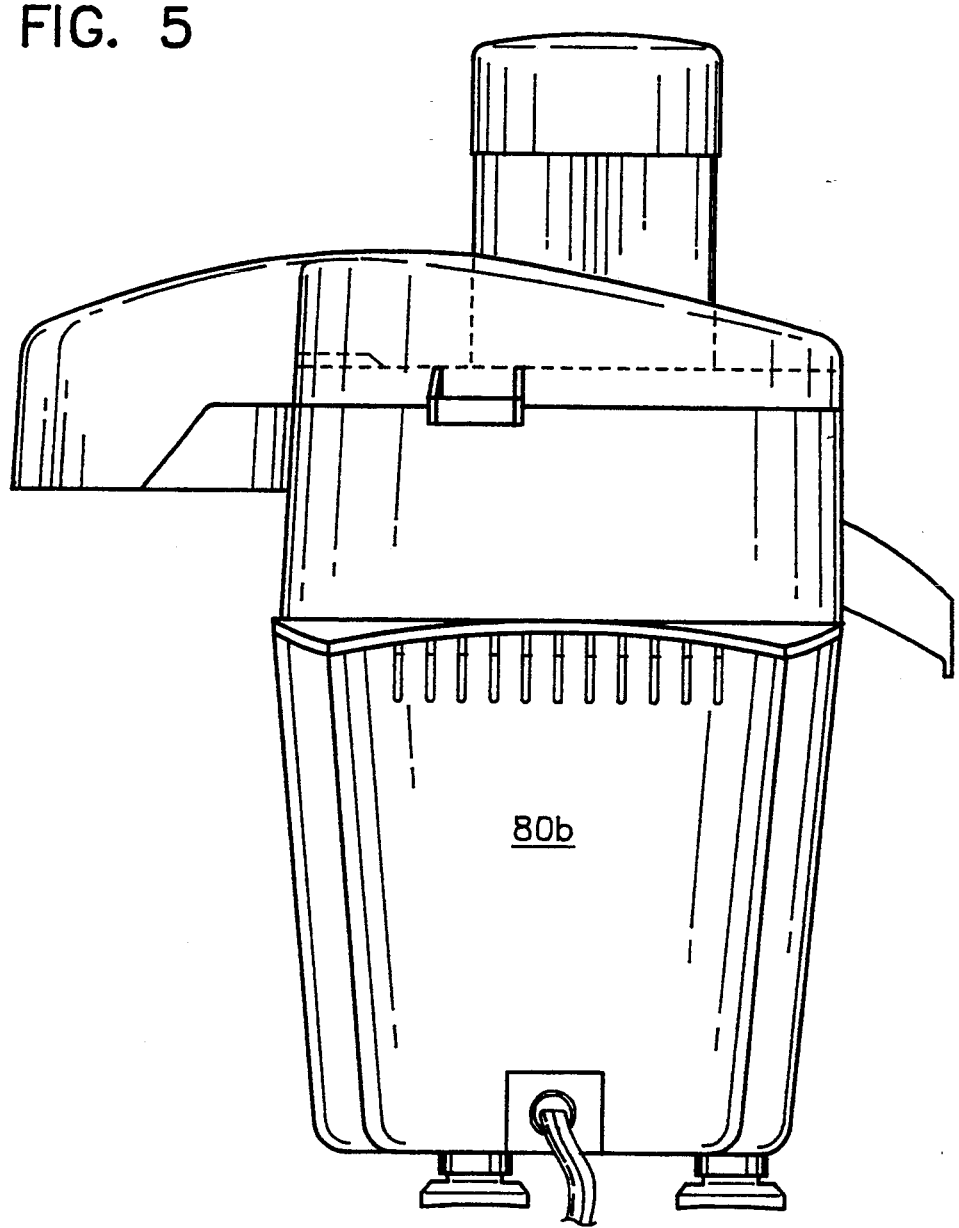

Referring now to FIG. 1, the juice bowl 14 mounts onto the top of juicer base 12. The blade basket 16 is received within the juice bowl 14 such that the blade basket 16 engages, and is axially rotated by, a drive shaft 22 of a motor 24 mounted within the housing 25 of base 12. The lid 18 is assembled to the juice bowl 14 to cover the top thereof and isolate the rotating blade basket 16 from the surrounding environment.

In operation, fruits and/or vegetables are forced through a feed tube 26 in lid 18 by the food plunger 20. Rotating blades 28 (FIG. 18) of the blade basket 16 comminute the produce forced through feed tube 26. These blades 28 are rotating in the counterclockwise direction with reference to FIG. 1.

The pieces of comminuted produce are thrown against the inner walls 30 of the blade basket 16. Centrifugal force propels the juice from the comminuted produce through holes 30a (FIG. 16a) in the blade basket 16. This juice collects in the juice bowl 14 and pours out through a juice spout 32 into an appropriate container (not shown). The pulp, however, cannot pass through the holes 30a and is expelled by the rotation of the basket 16 over the top of this basket and through a pulp chute 34 into a pulp container (not shown). In this manner, the juice extractor 10 separates the produce into juice and pulp.

Figure 6:
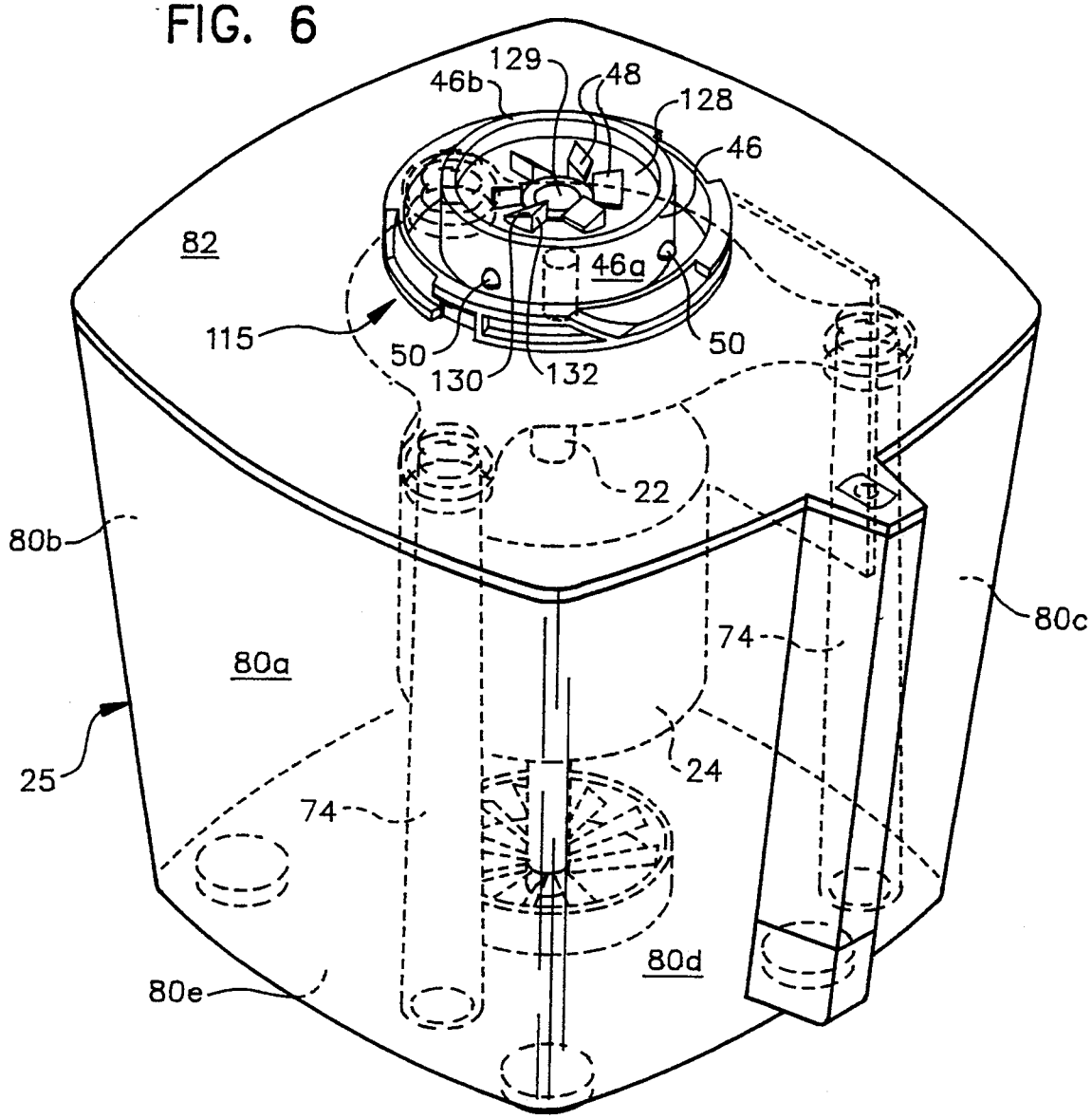
FIGS. 6-10 are perspective, top, fragmentary side, and bottom views of the juicer base showing in more detail a system for mounting the blade basket thereon.
Figure 8:
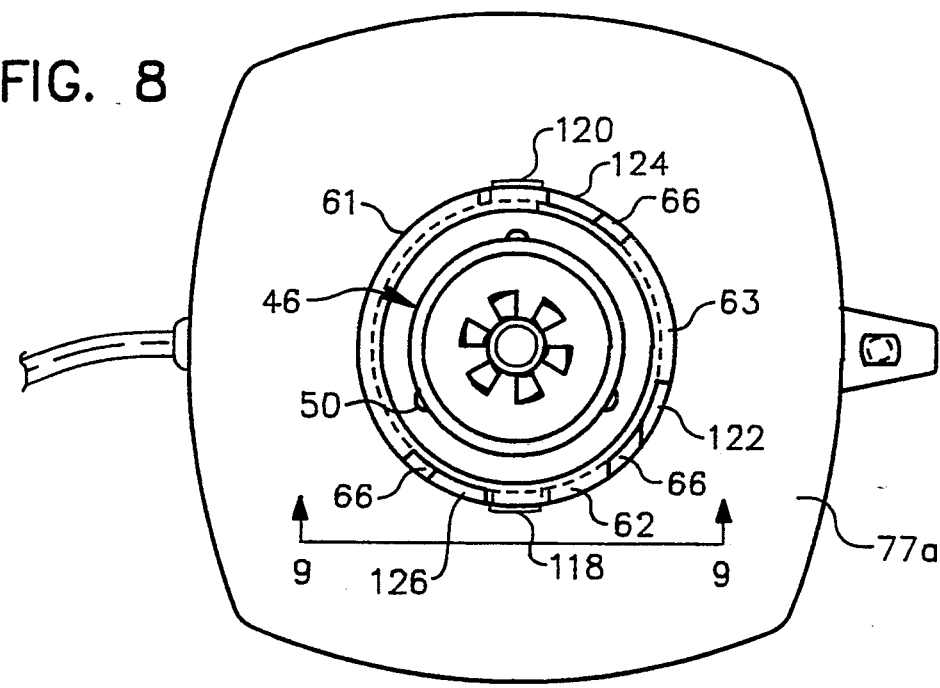

The following features of the present invention are of particular significance:

a. The holes 30a of the blade basket 16 are sized and the side walls 30 of the blade basket 16 are angled with respect to the drive axis to allow passage therethrough of: (a) a high percentage of the juice extracted from the produce; but (b) only a low percentage of the pulp. The resulting juice collected in the juice bowl 14 is clear because it contains only a very small percentage of pulp.

b. A motor interlock with an interlock column 36 which comprises a base segment 38, a bowl segment 40, and a lid segment 42 extends vertically along the right side of the juice extractor 10. The segments 38, 40, and 42 span the sides of base 12, juice bowl 14, and lid 18, respectively. The bowl segment 40 so mechanically interconnects with the base and lid segments 38 and 42 that, only when these interlock column segments are properly aligned, will the motor 24 be allowed to operate. Accordingly, the interlock 36 prevents the user from accidentally coming into contact with the rotating basket 16.

c. A scraper/deflector 44 (FIG. 1) is integrated with lid 18. This scraper 44 is arranged with only a small gap between it and the inner surface of the blade basket 16 near the pulp chute 34 and on the side of chute 44 in the direction of rotation of blade basket 16. The scraper 44 limits the accumulation of pulp on the basket wall 30 and promotes the discharge of the excess through pulp chute 34. Also, the pulp is evenly spread over the basket wall 30 and thus does not cause the basket 16 to become unbalanced.

d. The interconnection of the blade basket 16 to the drive shaft 22. As shown in FIGS. 6 and 8, the motor drive shaft 22, which is aligned along drive axis A, terminates at its upper end in a drive hub 46. This hub 46 comprises: (a) a series of drive cams 48 arranged in a circle about the drive axis A; and (b) spring loaded detents 50 radially extending from the outer surface 46a of the drive hub 46. A basket hub 52 (FIGS. 16–18) is formed on the lower side of the blade basket 16. The hub 52 comprises a series of arcuate blade basket cams 54 arranged in a circle about the axis of the blade basket hub. An annular groove 56 open onto the inner surface of this hub 52.

Figure 24:
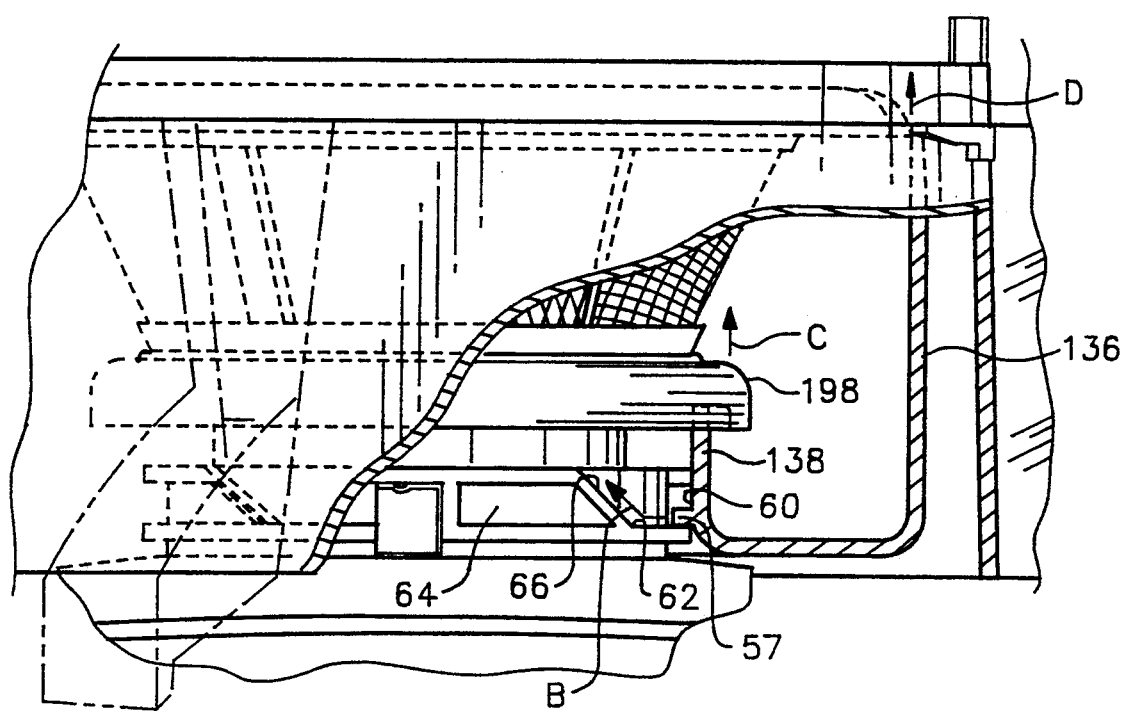
FIG. 24 is a fragmentary, partially sectioned view of the juice bowl and blade basket assembled to the juicer base.
Figure 25:
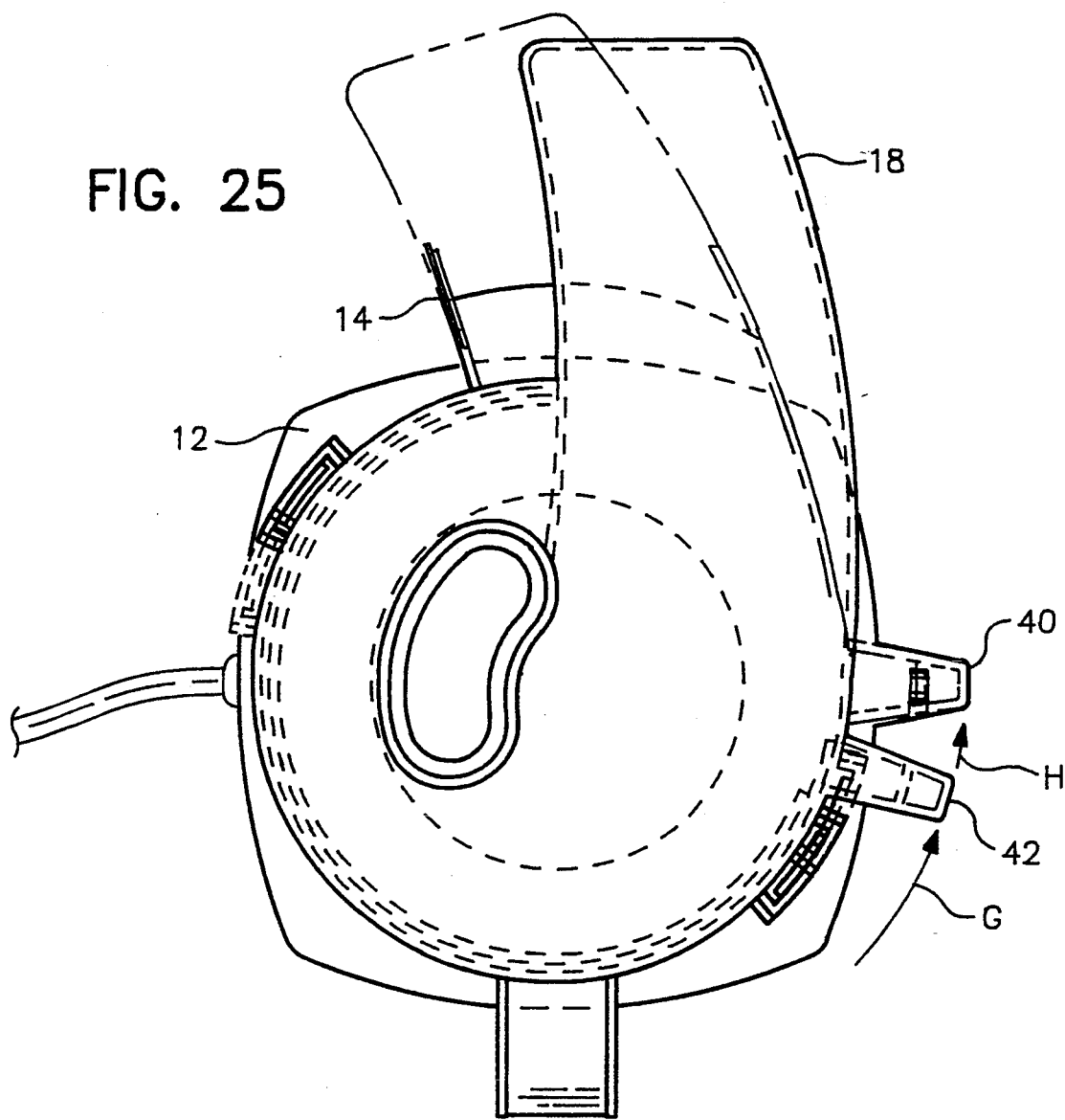
FIG. 25 is a top view of the juicer showing how a motor controlling interlock switch is closed as the juice bowl lid is coupled to the juice bowl.

As is perhaps best suggested in FIG. 17, the drive hub 46 is aligned with the basket hub 52 such that the drive cams 48 impart the axial rotation of the drive shaft 22 to the basket cams 54, thereby rotating blade basket 16 about the drive axis A. At the same time, the detents 50 engage the blade basket hub in groove 56 to resist movement of the blade basket 16 away from the drive hub 46 along drive axis A.

e. As is best shown in FIG. 24, fixed camming detents 57 and 58 (only one shown) extend inwardly from an inner surface 60 of the juice bowl 14. When the juice extractor 10 is assembled, these detents 57 and 58 extend into cavities 61a and 62a (one shown in FIG. 8) formed below upper peripheral ridges 61 and 62 on the outer surface 64 of the housing 25 of juicer base 12.

To remove juice bowl 14, the bowl 14 is rotated in the direction of arrow B in FIG. 24 relative to housing 12. After the bowl 14 is rotated through a small angle, the detent 57 encounters a cam surface 66 on the juicer housing 25. As the juice bowl 14 is rotated further, cam surface 66 acts on the detent 57 to cause the juice bowl 14 to move upwardly. Annular ridges 68 and 70 on the juice bowl 14 in turn act on the knife basket 16 (see arrows C and D) to displace it along drive axis A relative to juicer base 12. The rotational force exerted on juice basket 14 is thus translated into an upward force on the blade basket 16. This depresses the spring detents 50 and displaces the detents from the groove 56 in the blade hub 52. This allows the blade basket to be removed from the juicer.

g. The motor 24 is suspended within the juicer housing 12 by three motor flanges 72 connected to hollow legs 74 (two shown in FIGS. 1 and 6) and bosses 76 depending from the juicer base top member or cover 77a (FIG. 26a). Motor supporting legs 74 are located at the apices of an imaginary equilateral triangle on the bottom 77b of housing 25 of the juice extractor base and are attached to the bottom of the base.

Resilient grommets 78 (FIGS. 26 and 26a) extend through holes 72a (FIG. 1) in motor mounting flanges 72. These grommets 78 isolate the legs 74 and bosses 76 from the flanges 72, thereby absorbing the vibration generated by the motor 24 and the rotating blade basket and prevent the transmission of this vibration to housing 12.

Each of the components described above will now be discussed individually in more detail, after which a detailed discussion of the assembly, use, and disassembly of juice extractor 10 will be provided.

The Housing Portion

Turning now to FIGS. 2–10, the juicer base 12 discussed briefly above has: (a) a housing 25 with front, left, back, and right side walls 80a, 80b, 80c, and 80d and bottom wall 77b; (b) the top cover 77 spanning the open upper end of housing 25 and including the depending bosses 76; and (c) the motor 24, which is mounted in housing with its output shaft 81 vertically oriented.

Figure 26:
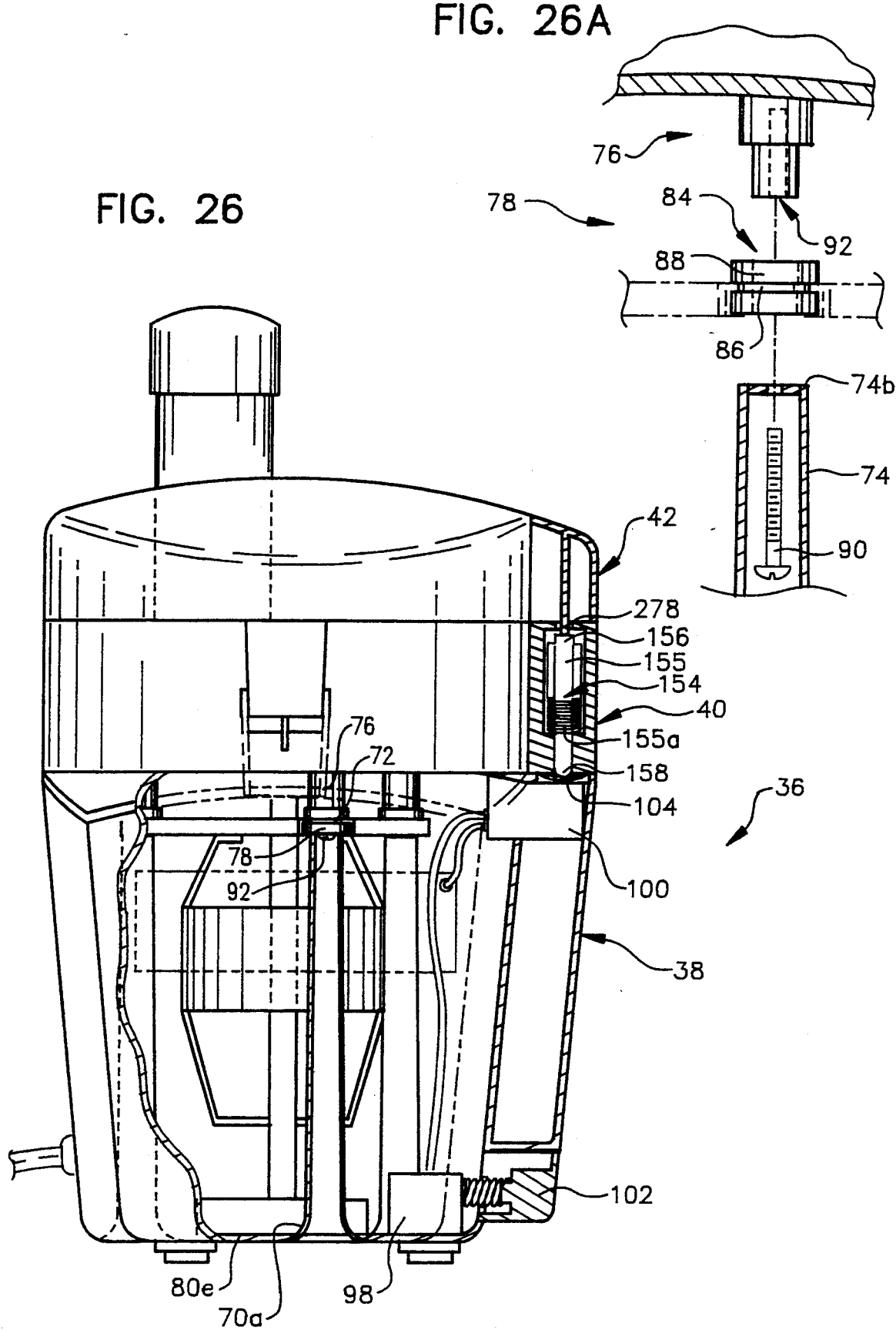
FIG. 26 is a partially sectioned side view of the juice extractor, depicting details of its interlock system and motor mounting system.

As shown in FIGS. 26 and 26a and mentioned above, motor supporting legs 74 are spaced around housing 25 and are securely mounted at their lower ends 74a to the bottom housing wall 77b. The top ends 74b of legs 74 are connected to the bosses 76 which extend from the lower surface of the housing cover 77a through grommets 78. The grommets 78 are cylindrical and have a hole 84 extending therethrough. An annular groove 86 is formed around the outer surface 88 of each grommet 78. When the juice extractor 10 is assembled, screws 90 are inserted into the centers of the hollow legs 74, extended through the grommet holes 84, and fastened in internally threaded holes 92 in the bosses 76. The annular grooves 86 around the grommets 78 are received in the holes 72a in the motor mounting flanges 72, suspending the motor 24 at three spaced points in housing 25. These grommets 78 isolate motor mounting flanges 72 from the legs 74 and projections 76. Consequently, motor- and blade basket-generated vibrations are not transmitted to the juicer base.

Also located inside the juicer base 12 is a motor controller circuit 94 (FIG. 27) mounted on a circuit board 96 (FIG. 26). This circuit comprises a triac T1 and an IC controller chip U1 therefor. The motor 24 is identified in the schematic as element M.

The controller chip U1 is a Triac Phase Angle Controller manufactured by Motorola and identified by part number TDA1185A. This chip U1 and the triac T1 are well-known and will be discussed below only to the extent necessary for a complete understanding of the present invention.

The motor controller circuit 94 operates in the following manner. An AC power signal enters the circuit 94 through a main switch S1 and an interlock switch S2. Only when both of these switches S1 and S2 are closed will the motor M be energized. The triac T1 is tied to the incoming AC power signal through resistor R9 and the motor M.

A gate pulse is generated at pin 2 of the chip U1. The triac T1 prevents current from flowing through the motor M when this gate pulse is absent and allows current to flow therethrough when the pulse is present. A feedback circuit within the chip U1 regulates the timing and duration of this gate pulse to control the power delivered to the motor M.

The gain of the feedback circuit within the chip U1 is first set at the factory by a variable resistor RP2 at pin 9. This gain should provide maximum torque while maintaining stable operation of the feedback circuit. The desired rotational speed of the motor M is next set at the factory by a variable resistor RP1 at pin 12. This desired rotational speed is in the range of 6000 to 7000 rpm, and is preferably around 6300 rpm. By setting resistors RP1 and RP2 to appropriate values, the gate pulse at pin 2 turns the triac T1 on at the point in the AC cycle necessary to hold the speed of the motor M constant at the desired value set at pin 12.

The circuitry associated with chip U1, triac T1, and motor M has a number of novel features and will accordingly now be discussed. Resistors R16 and R17 increase the sensitivity of variable resistor RP2. Resistor R13 and capacitor C13 delay the rise of the signal input to pin 13. This delay causes the motor M to ramp up to the desired speed value, producing a soft start. The diode D2 connected across resistor R13 bleeds off resistor R13 when the motor is turned off. The resistor R15 and capacitor C15 provide increased stability to the control circuit.

Figure 27:
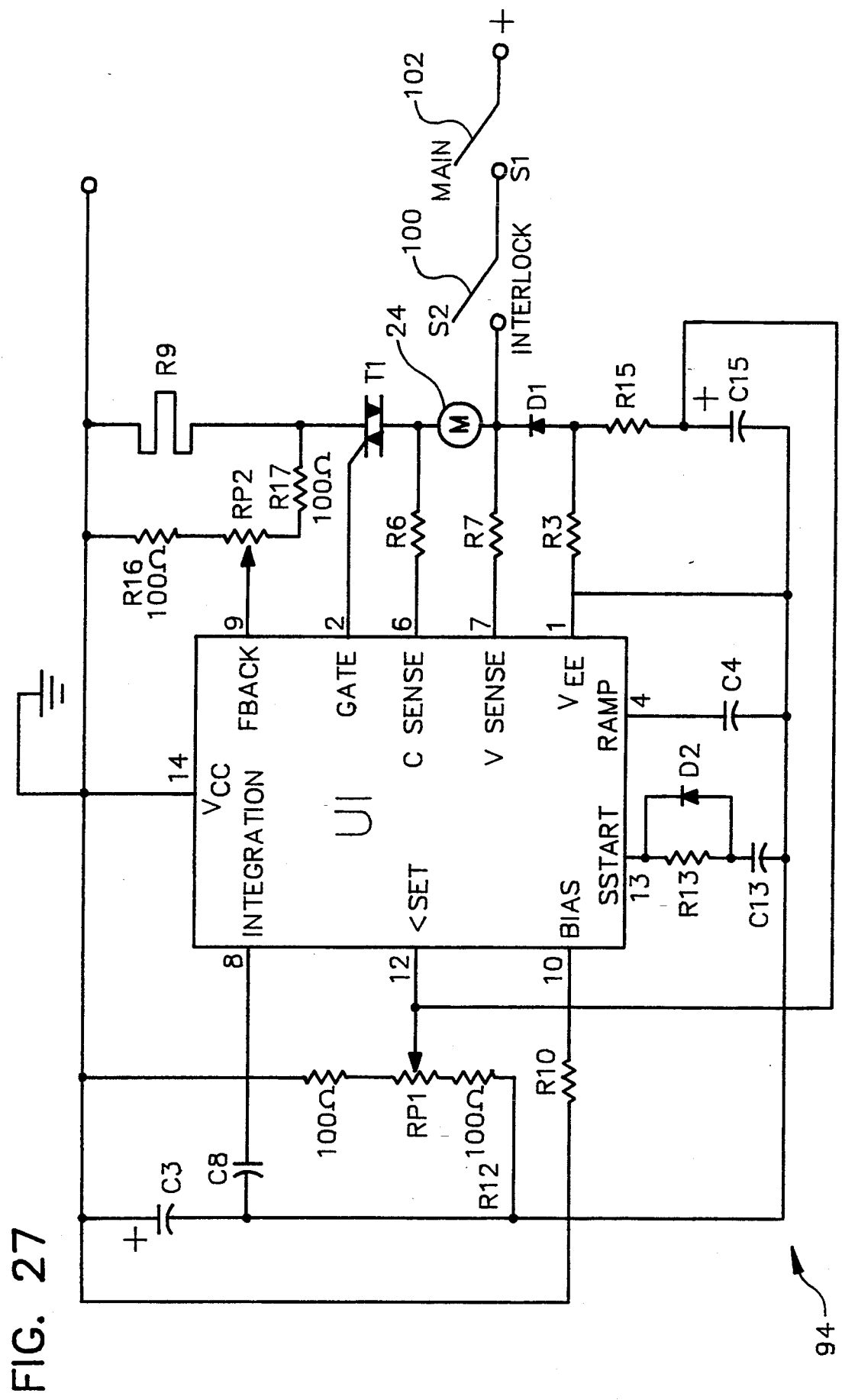
FIG. 27 is a schematic diagram of a motor control circuit which controls the operation of the juice extractor motor.

Referring now to FIG. 26, the main and interlock switches referred to as S1 and S2 in FIG. 27 are identified by reference characters 98 and 100, respectively. These switches 98 and 100 are mounted along the right side 80d of the housing 25 of juicer base 12.

An actuator for main switch 98 extends from housing 25 at the lower end of the base segment 38 of the interlock column 40. By depressing actuator 102, the main switch 98 may be opened and closed.

The actuator 104 of the interlock switch 100 extends upwardly through interlock column segment 30 and a tab 106 on the top wall 77a of housing 25. This tab extends over the top end of the base interlock segment 38. A flexible protector 108 covers the top of actuator 104 to keep foreign material out of the interlock column.

Actuator 104 is pressed downwardly through the covering 108 to close the interlock switch 100. It is spring loaded and therefore moves upwardly to open the interlock switch 100 when the downward force on the actuator 104 is removed.

Referring again to FIG. 6, a fan 110 is mounted on the lower end of the motor output shaft 22. This fan 100 draws cooling air into the housing 25 of base 12 through holes 112 (FIG. 10) in the bottom wall 77b of the housing.

Figure 7:
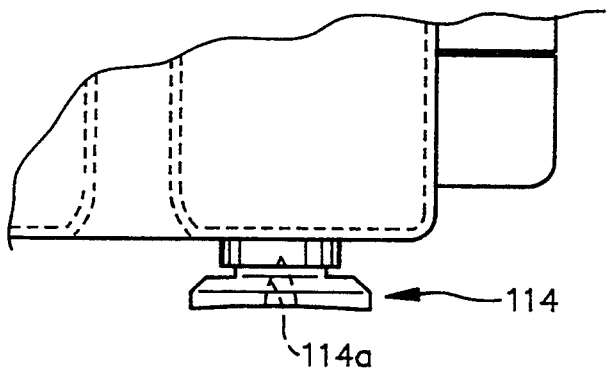
Figure 10:
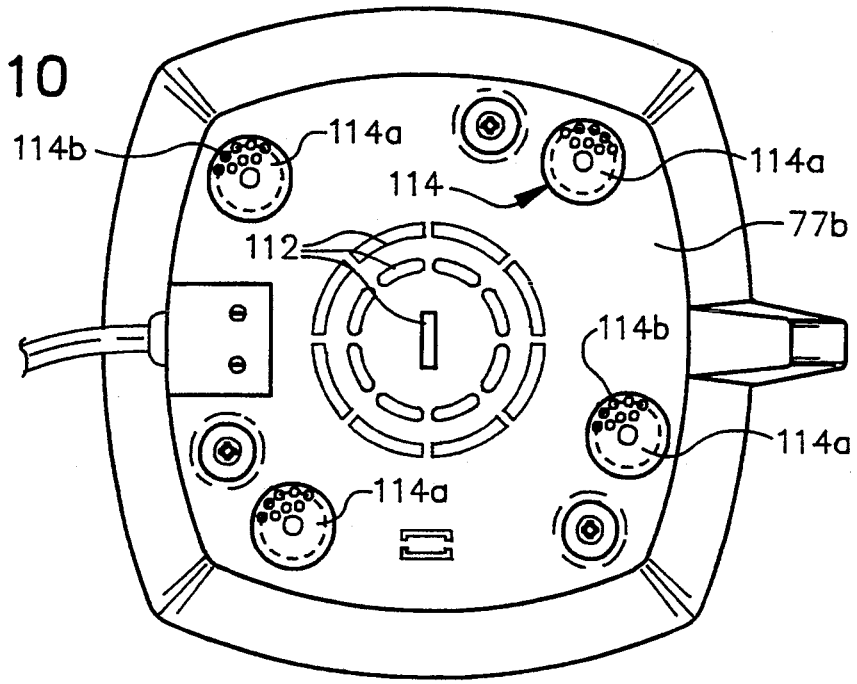

Depicted in FIGS. 7 and 10 are four resilient feet 114 which are attached to the bottom wall 77 of housing 25. These feet 114 each have a base 114a and integral, depending nubbins 114b. The nubbins 114b of resilient feet 114 help prevent the vibration of the motor 24 from being transferred to the surface on which the juice extractor 10 is placed and allow a large frictional force to be generated between the juicer and the supporting surface. The result is that feet 114 keep the juicer from being walked along the supporting surface by vibration generated by motor 24 and blade basket 12 and not absorbed by vibration absorbers 78.

Figure 9:
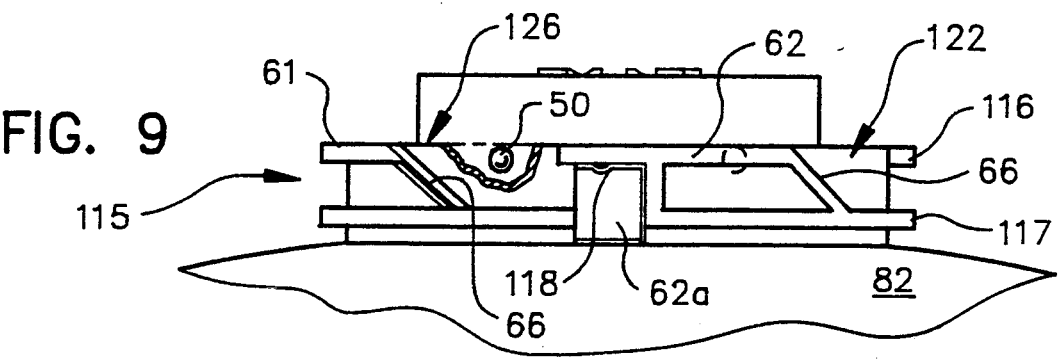

The motor drive shaft 22 extends upwardly through a hole in base housing cover 77a. The drive hub 46, which is mounted on the upper end of the shaft 22, resides within a connector 115 formed on cover 82. The drive hub 46 and connector 115 are cylindrical and are coaxially aligned along drive axis A. The hub 46 extends slightly beyond the connector 115 (FIG. 9). As will be discussed in more detail below, connector 115 engages the juice bowl 14 to couple the juice bowl to the juicer base 12.

The above-mentioned upper ridges 61 and 62 on base housing 25 are coplanar and extend along the perimeter of the upper edge of the outer surface 64 of integral connector 115 (FIG. 9). The detent cavities 61a and 62a are located on opposite sides of the surface 64 under these ridges 61a and 62a.

A third upper ridge 116 coplanar with the ridges 61 and 62 also extends along surface 64 but does not have a detent cavity formed thereunder. This third ridge 116 is located between the detent cavities 61a and 62a. A lower ridge 117 extends almost completely around the outer surface 64 and is parallel to, and spaced a short distance below, the ridges 61 and 62.

Spring-biased detents 118 and 120 are arranged within the detent cavities 61a and 62a under the upper ridges 61 and 62, respectively. These detents 118 and 120 move upwardly when an appropriate upward force component is applied thereto, but are biased to return to their initial, lower positions when this force is removed.

A series of gaps 122, 124, and 126 is formed between the upper ridges 62 and 116, 116 and 61, and 61 and 62, respectively. The cam surfaces 66 discussed above extend downwardly approximately half-way through the gaps 122, 124, and 126 from upper ridges 61, 62, and 116 to lower ridge 117.

Referring to FIGS. 6 and 8, the above-mentioned drive cams 48 are located within the drive hub 46. These cams 48 are integrally formed on a cam segment 128 of the drive hub 46. Each cam has a slanted surface 130 and a vertical surface 132 that is parallel to the drive axis A. Six of these drive cams 48 are arranged at equal intervals around an alignment orifice 129, which is aligned along the drive axis A. As will be discussed in further detail below, these drive cams 48 engage basket cams 54 to rotate blade basket 16.

Arranged at three equally spaced points around the outer surface 46a of the drive hub 46 are the spring loaded detents 50 referred to above. These detents 50 are rounded and normally protrude from the outer surface 46a of the drive hub 46. A downward force on these detents 50 causes them to move radially inwardly to a second, compressed position. When this force is released, the detents 50 spring back to the first position. These detents 50 couple the blade basket 16 to the drive hub 46 as will be discussed in further detail below.

The Juice Bowl

Referring now to FIGS. 11–14, the juice bowl 14 of juice extractor 10 is an integrally formed plastic component having three coaxially aligned cylindrical walls: an outer wall 134, a splash wall 136, and an inner wall 138. An annular bottom wall 140 joins the splash and inner walls 136 and 138 and cooperates with them to form a juice collecting basin or sump 141. The corner 140c at which the bottom juice bowl wall 140 joins the splash wall 136 is curved for easier cleaning of the juice bowl 14 and for improved flow of juice down the splash wall 136.

A spout inlet 142 in the splash wall 134 allows juice to flow into spout 32 from juice basin 140. More specifically, a curved lower surface 144 of the spout 32 is substantially coplanar with the juice bowl bottom wall 140 at spout inlet 142. The spout surface 144 extends outwardly and downwardly from the bottom wall 140 so that juice collecting in the basin 141 flows out of the juice bowl 14.

A juice barrier 146 partially covers spout inlet 142. The lower edge of barrier 146, which is an extension of splash wall 136, defines the upper boundary of spout inlet (or juice bowl outlet) 142.

Figure 14:
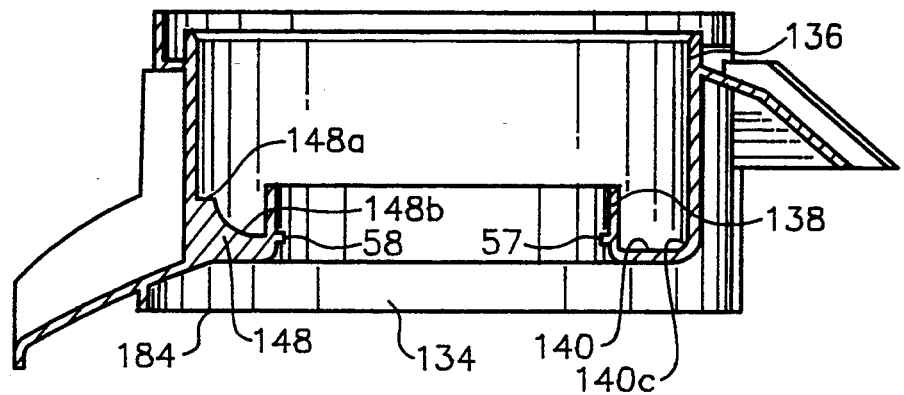

Integral with and extending downwardly from juice barrier 146 and radially inwardly to the containing wall 138 is a vertically oriented juice baffle 148 (FIG. 14). This baffle has a horizontal top edge 148a and a downwardly curved side edge 148b, which extends from top edge 148a to inner container wall 138. Baffle 148 keeps juice from circulating around the annular juice collecting basin 141 and directs the juice into spout 32. The benefits provided by baffle 148 will become clear from the discussion below of the use of juice extractor 10.

The lower half of the above-mentioned pulp chute 34 is formed by an integral, horizontally extending ledge or projection 150 on juice bowl 14. The outer part of the ledge is slanted downwardly, which allows the pulp to exit the juice extractor 10 substantially unhindered. Vertical walls 152a and 152b on opposite sides of ledge 150 confine the pulp to chute 34. Indents 153a and 153b are formed on those chute side walls 152a,b opposite the direction of rotation of the blade basket 16. As will be described in detail below, indents 152a and 152b serve as stops; they limit the rotation of juice extractor lid 18 when the latter is assembled to juice bowl 14.

The bowl segment 40 of the interlock column 36 mentioned above is formed on the outer wall 134 of the juice bowl. This segment 40 extends the entire vertical height of wall 134. Contained within interlock segment 40 is a plunger assembly 154 comprising a spring biased plunger 155 and an associated biasing spring 155a (FIG. 26). Spring 155a biases the plunger 155 such that: (a) the plunger 155 is normally in a first "up" position in which its rounded upper end 156 is adjacent an upper side 158 of the interlock column segment 40 and its lower end 58 is completely within the segment 40; and (b) the upper end 156 of the plunger is depressed by a downward force to a second "down" position in which the lower plunger end 158 (FIG. 13) is forced downwardly and out of the juice bowl interlock segment 40. When the downward force is removed, the bias spring 155a causes the plunger 155 to move back to the first position. As will be discussed in more detail below, this plunger 155 mechanically engages the lid 18 and the interlock switch 50 to prevent the motor 24 from being turned on during unsafe conditions.

Lid supporting and coupling structure 159 is formed on the upper portion of the juice bowl 14. This structure comprises: (a) a generally cylindrical mounting wall 160; (b) a stop wall 162 generally tangential to the mounting wall 160; and (c) a set of cam projections 164 and 166 (FIG. 12) on opposite sides of and extending along the top edge of the outer juice bowl wall 134.

The mounting wall 160 extends along the upper periphery of the outer juice bowl wall 134. A gap 168 in the mounting wall allows pulp to escape from blade basket 16 into pulp chute 134. The mounting wall 160 has a slightly smaller radius than the outer juice bowl wall 134, and a horizontal mounting ledge 170 is formed between walls 134 and 160. A deflector plate 172 is formed at the top of the mounting wall 160 near the pulp chute 34.

The stop wall 162 is parallel to, and slightly set back from, the surface 153b on the wall 152b discussed above. The purpose of the stop wall 162 and indented surfaces 153a,b will be discussed below.

The cam projections 164 and 166 are identical, and only the projection 164 will be discussed in detail herein. This projection has a horizontal top surface 174, a bottom portion with a downwardly slanted camming surface 176, a horizontal bottom surface 178, and a stop member 180. A rounded detent 182 extends radially from the side of projection 164.

A lower mounting structure 183 is formed on the bottom portion of the juice bowl 14 to couple the juice bowl to the base 12 of the juice extractor by: (a) the bottom edge 184 of the outer juice bowl wall 134; (b) an alignment detent 185; and (c) the above-discussed set of fixed camming detents 57 and 58. Detents 57 and 58 are identical, and only one will be described in detail herein.

Figure 11:
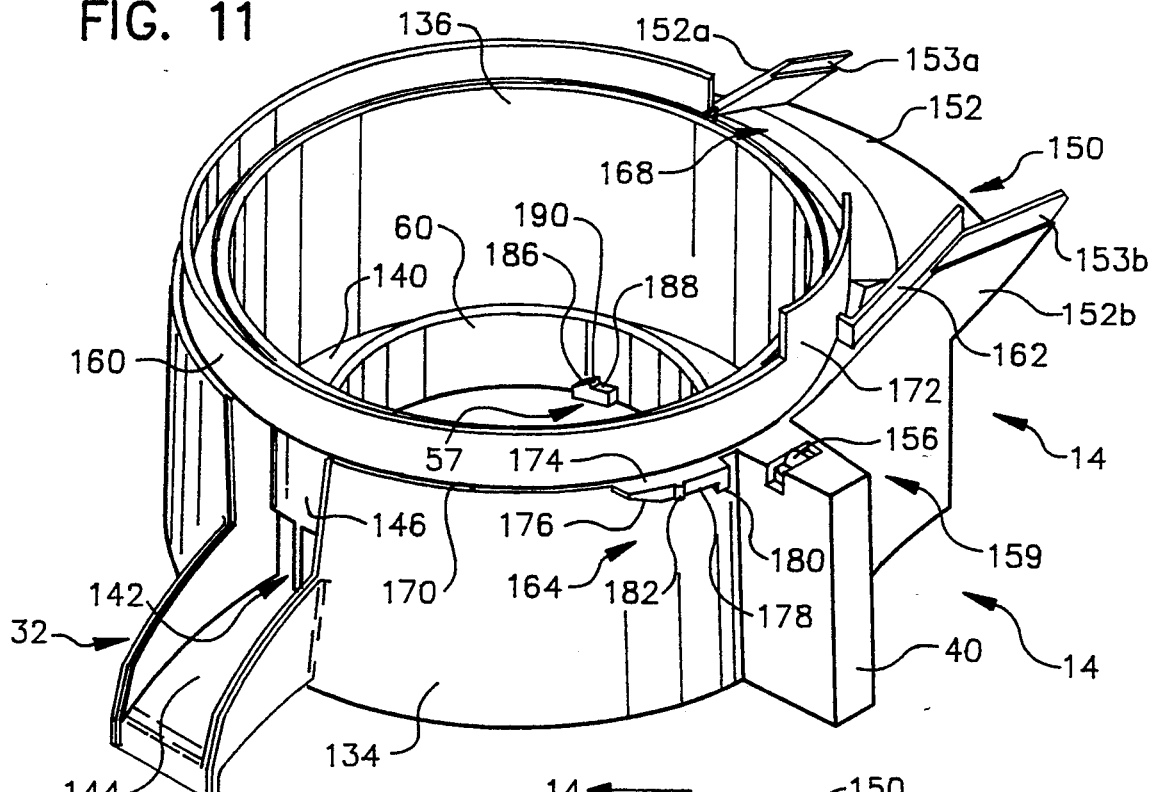
FIGS. 11-14 are perspective, top, bottom, and side cut-away views of the juice bowl.
Figure 12:
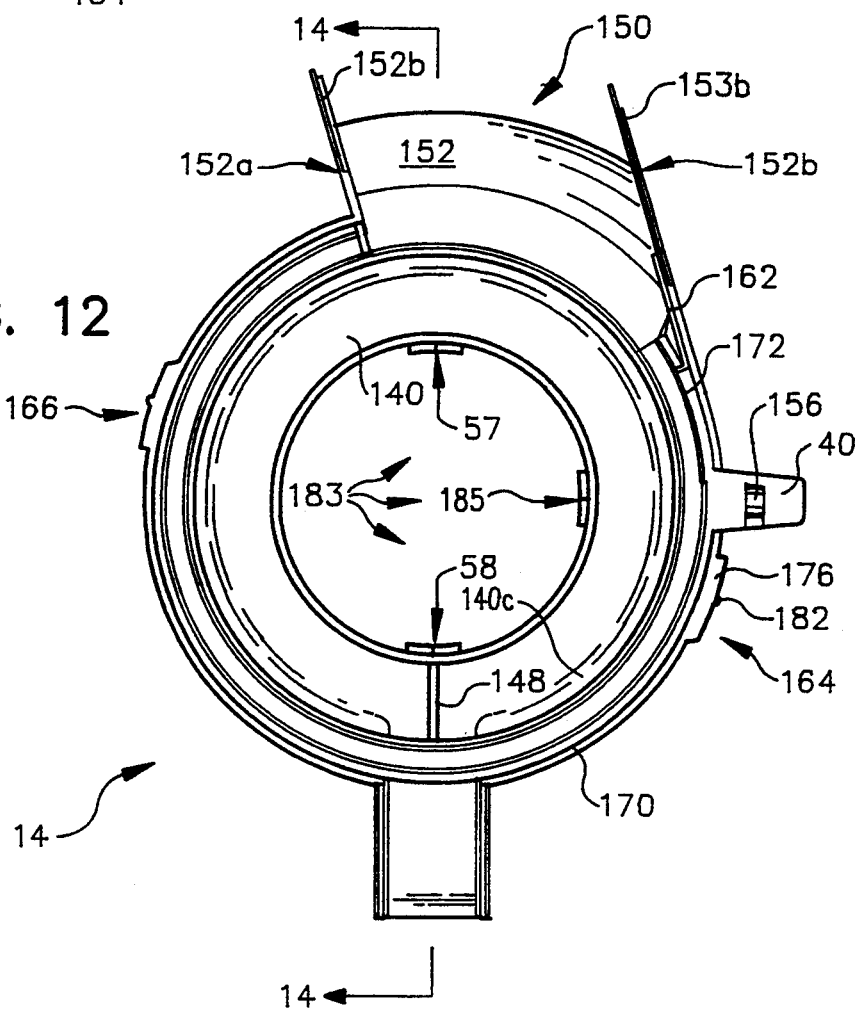
Figure 13:
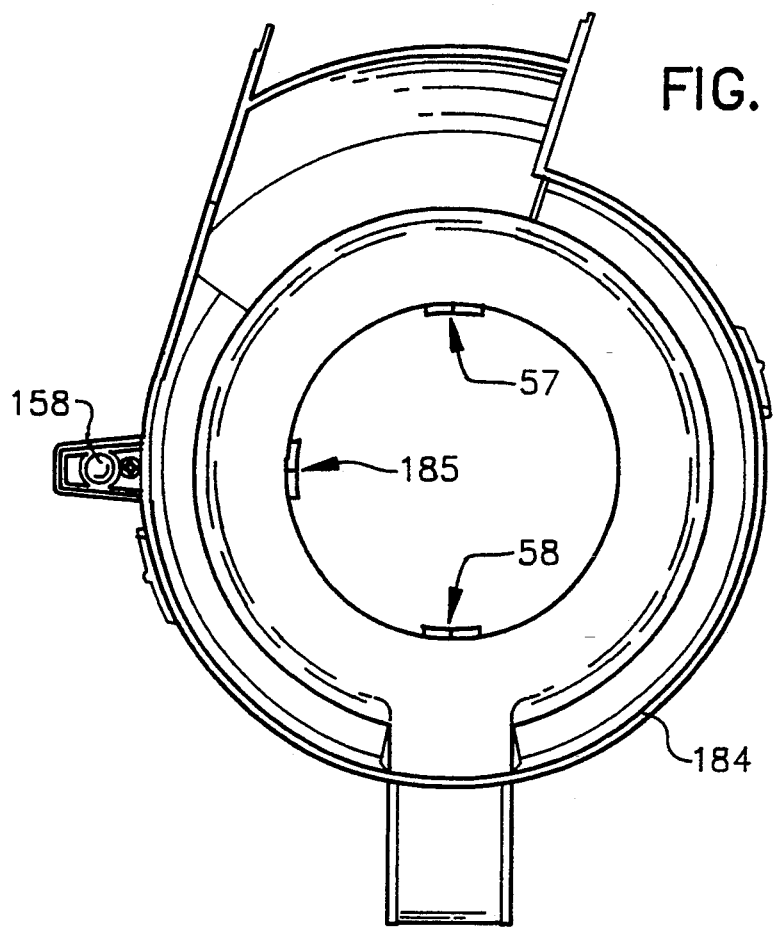

As shown in FIG. 11, detent 57 is an integral projection formed at the lower portion of, and protruding from, the inner surface 60 of the juice bowl containing wall 138. As shown in FIG. 11, detent 57 has an upwardly slanted camming surface 186, a horizontally aligned surface 188, and a vertical surface 190 connecting the surfaces 186 and 190.

The upper and lower, lid and juice bowl mounting structures 159 and 183 of the juice bowl 14 are employed to attach the juice bowl 14 to the base 12 of juice extractor 10 and to attach juice bowl lid 18 to juice bowl 14 as will be discussed in detail below.

The Blade Basket

Blade basket 16 (FIGS. 16–18) includes: (a) a plastic base 192; (b) a frustoconical, stainless steel filter or screen 194; and (c) a stainless steel blade or knife disk 196. These components are aligned along the axis of rotation A of juicer motor output shaft 22 when the blade basket is coupled to the output shaft.

Base 192 has an outwardly and downwardly extending cylindrical outer wall 198, a disk-shaped base or filter support 200, and the basket hub 52 discussed briefly above. The hub is formed on the bottom surface 202 of the filter support 200.

The blade basket hub 52 is generally cylindrical in shape and is aligned along axis A. The inner diameter of this hub 52 is slightly larger than that of the drive hub 46 attached to the upper end of juicer motor output shaft 22. This allows the basket hub 52 to fit snugly over the drive hub 46 in the course of drive-coupling the blade basket to the drive hub by which the blade basket is rotated.

The groove 56 on the inner side of hub 52 is spaced slightly above the bottom edge 52a of the hub (FIG. 17). For reasons which will become clear below, this groove 56 is also vertically so located that it is spaced above the bottom surface 202 of the blade basket base 192 a distance approximately equal to the vertical distance between the top edge 46b of the drive hub 46 and the spring-loaded detents 50 formed on the outer surface 46a thereof when the blade basket 16 is coupled to the drive shaft.

The above-introduced blade basket cams 54, three screw receptacles 204, and an alignment post 206 are integrally formed on bottom surface 202 of blade basket base 192 within the confines of hub 52. A shallow cylindrical cavity 208 is formed on the upper surface 209 of the base 192 with a circular raised portion 210 being formed in the center of this cavity.

In the illustrated juicer or juice extractor 10, three blade basket cams 54 located at equally spaced intervals along a circle centered on the alignment post 206 and on the bottom surface 202 are employed. Each cam 54 has a slanted upper surface 54a. As will be discussed in detail below, these blade basket cams are dimensioned and spaced such that each cam 54 can fit between two of the drive cams 48 on the drive hub 46 attached to the upper end of motor output shaft 81.

The filter 194 of blade basket 16 comprises a bottom plate 212, three screen or filter segments 214, and an annular rim 216. The screen segments 214 are arcuate in shape. The filter 194 is formed by: (a) bending the screen segments 214 and joining their overlapped, imperforate edge portions 214a to form a frustum; (b) joining the rim 216 to the upper, wider diameter edges 218 of the screen segments; and (c) joining bottom plate 212 to the bottom, smaller diameter, imperforate edges 220 of the screen segments (FIG. 18). The screen segments 214 form the wall 30 of the blade basket 16. With the blade basket aligned along axis A, wall 30 has an angle δ with the axis A (FIG. 17) ranging between 28 and 35 and preferably about 30 degrees.

A hole 222 having approximately the same diameter as the raised portion 210 of blade basket base 192 is formed in the center of the blade basket filter bottom plate 212.

The blade disk 196 has the above-discussed blades 28 formed on the upper side thereof. The illustrated blade disk has eleven concentric circular arrays of blades 196a. The blades of the several arrays are aligned along radii meeting at axis of rotation A.

The blades 28 are integral with and protrude upwardly from the base 196b of the blade disk. In plan, the blades have a teardrop shape with sharp leading edges and blunted trailing edges. Viewed front-to-back, the blades are triangular and have sharp apices. In profile, the leading edges of the blades are swept forward; the trailing edges meet the base 196b of blade disk 196 at an acute angle.

The outer edge 224 of blade disk 196 is circular and has a slightly smaller diameter than the lower, smaller diameter base 220 of filter 194.

The blade basket is assembled in the following manner. First, the bottom plate 212 of the frustoconical screen 194 is placed within the cavity 208 of the blade basket base 192 such that hole 222 fits snugly around the raised portion 210 on base 192.

The blade disk 196 is then placed in screen 194 and seated on the bottom plate 212 of the base with the blades 28 facing upwardly. Screws 226 are then inserted through holes 228 and 230 in the blade disk 196 and plate 212 and threaded into holes 232 in base 192. When these screws 226 are tightened, the filter 194 is securely gripped between the blade disk 196 and the blade basket base 192.

Of importance are the dimensions of the holes 30a in the blade basket 16. These holes 30a have a width w and a height h (FIG. 16A) with w being significantly larger than h. More particularly, the ratio of w to h is preferably between 2/1 and 3/1, with h being a maximum of 2 mm. Preferred h and w are 0.259 mm and 18945 mm. Also, the angle δ, shown in FIG. 17, is preferably between 25 and 40, and is 35° in the preferred embodiment.

As will be discussed in further detail below, these dimensions h and w and angle δ, along with the rotational speed of the motor 24, cooperate to ensure that the greatest percentage of juice is extracted from the produce and that this juice contains the lowest possible percentage of pulp.

The Juice Bowl Lid

The juice bowl lid 18 is best shown in FIGS. 9-23. Referring first to FIG. 19, lid 18 is fabricated from clear plastic so that the operation of juicer 10 can be observed by the operator. It has a generally cylindrical peripheral wall 234; a top wall 236; the lid segment 42 of interlock column 36; feed tube 26; a locking system 237 with a pair of members 238 and 240 which are engageable with the projections 146 and 166 on juice bowl 14 to lock the lid to the juice bowl; and a chute cover 242.

The chute cover 242, which forms the upper half of pulp chute 34, is integral with and extends outwardly from the peripheral wall 234 of the lid. This cover has a top wall 244, a side wall 246 which meets outer wall 234 at corner 252, a second side wall 248 and an end wall 250. Those walls cooperate to direct pulp discharged from blade basket 16 into the pulp container (not shown). The side wall 248 extends tangentially from the peripheral wall 234 beginning at a point near the lid interlock segment 42.

The locking members 238 and 240 of the lid-to-juice bowl locking system 237 are attached to the outer surface 254 of the peripheral wall 234 by a pair of integral struts indicated at 238a,b and 240a,b. Locking members 238 and 240 extend out from and slightly below the wall 234 on opposing sides thereof. Inwardly extending bottom ridges 256 and 258 (FIG. 22) are formed on the lower ends of members 238 and 240; and, rounded detents 260 and 262 (FIG. 22) are formed on the inner surfaces of the locking members. Locking system 237 allows the juice bowl lid 18 to be locked onto the juice bowl 14 by first seating the lid 18 onto the juice bowl 14 by first seating the lid 18 on juice bowl 14 and then rotating it to trap the projections 164 and 166 on the juice bowl between ridges 158 and 168 on lid 18 and the bottom edge of the cylindrical, peripheral wall 234 of the lid.

Extending down from the top wall 236 of the lid inside outer peripheral wall 234 is an inner wall 264 (FIG. 22). Between this inner wall 264 and the peripheral wall 234 is a gap 266 which aligns the lid 18 on the juice bowl 14 during assembly by trapping the upper part of the juice bowl outer wall 134 as will be discussed in detail below.

Feed tube 26 extends through an orifice in the top wall 236 of the lid 18. The bottom edge 268 of the feed tube 26 is parallel to, and approximately 2 mm above, the blades 28 of the blade disk 196 when the juice extractor 10 is assembled.

As discussed briefly above, an important aspect of the invention is the scraper/deflector 44 which keeps pulp from building up on blade basket filter 194. Scraper/deflector 44 is integral with and extends from the bottom side 270 of the juicer lid top wall 236 to the bottom edge 268 of the feed tube 26 and from the inner surface 272 of the peripheral lid wall 234 near corner 252 to feed tube 26 (FIG. 21).

A slanted edge 274 is formed on scraper 44. The slanted edge 274 has substantially the same angle δ as the filter 194. When the juice extractor 10 is assembled, this edge 274 is spaced from the filter by a small gap.

Lid interlock segment 42 has a box portion 276 and a downwardly projecting, fixed interlock tab interlock plunger 155 in the juice bowl 14 when lid 18 is correctly assembled to juice bowl 14. That allows the interlock switch S2 to be closed if the juice bowl 14 is also correctly assembled to the juicer base 12.

Food Plunger

The food plunger 20 is a single, hollow piece of plastic having a closed bottom end and a cross-section that closely matches the cross-section of feed tube 26. Plunger 20 is used in a conventional manner to push the produce being juiced to a level where it can be shredded by the blades 28 in blade basket 16.

Assembly and Use

The assembly, use, and disassembly of the present invention is described below with reference to FIGS. 1, 6, 15, 17, 24, 25, and 26.

Before assembly, the juicer base 12 appears as shown in FIG. 6. The first assembly step is to mount the juice bowl 14 on base 12. To accomplish this, the juice bowl is seated on base 12 with the fixed detents 57 and 58 and alignment detent 185 on the upper ridges 63, 61, and 62, respectively, of the connector portion 115 of the base's housing 25 (FIG. 15).

Figure 15:
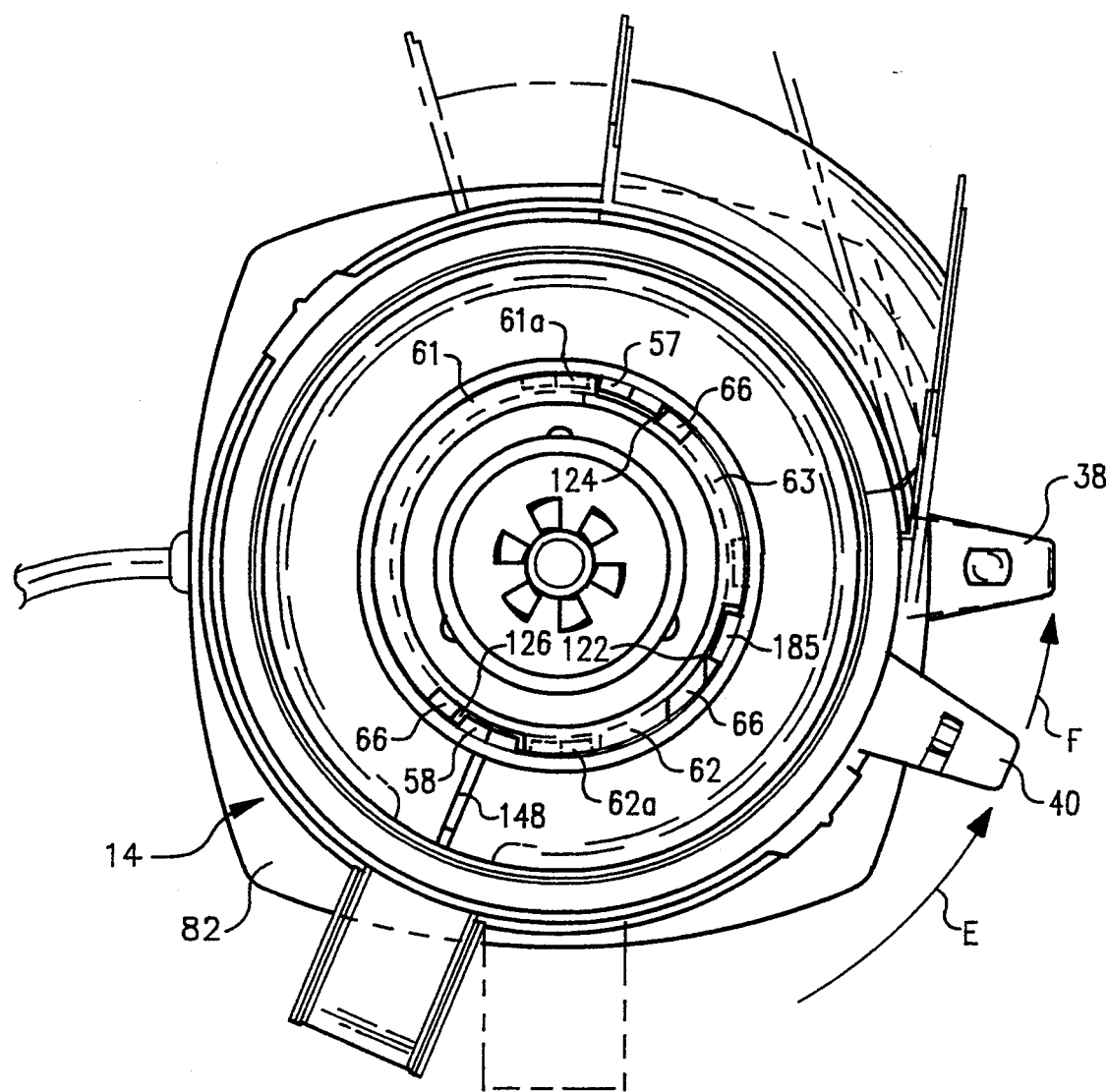
FIG. 15 is a top view of the juicer showing how the juice bowl is rotated to lock it to the base.

Then the juice bowl 14 is rotated, as shown by arrow E in FIG. 15, until detents 57, 58, and 185 slide down the camming surfaces 66 and into the connector's gaps 124, 126, and 122. The alignment detent 185 ensure that the bowl segment 40 properly aligns with or is keyed to the base segment 38 when the juice bowl 14 and housing portion 12 are assembled so that the juice bowl can be assembled to the connector 115 in the manner just described.

With the detents 57, 58, and 185 slid down camming surfaces 66, the bottom edge 184 of the juice bowl outer wall 134 contacts the top surface 82 of the juicer base housing 25. This contact causes the bowl 14 to be stably seated on the base.

Further rotation of the bowl 14 in the direction shown by arrow F causes the camming surfaces 186 on the detents 57 and 58 to contact the spring detents 118 and 120, respectively. Continued rotation causes the camming surfaces 186 to exert an upward force component on the detents.

The detents 57 and 58 slide underneath these raised spring detents 118 and 120 into the detent cavities 61a and 62a. When the vertical surfaces 190 on the fixed detents 57 and 58 move past the spring biased detents 118 and 120, the upward force component is removed; and the spring bias forces the detents 118 and 120 back into their lower positions. The detents 118 and 120 then abut the vertical detent surfaces 190 to lock juice bowl 14 to juicer base 12.

In this locked position, the juicer bowl interlock segment 40 is aligned with the base interlock segment 38 such that the interlock plunger 155 is directly above, but does not contact, the actuator 104 of the interlock switch 100 (or S2).

The next step in the assembly process is to place the blade basket 16 in juice bowl 14 and couple the blade basket to the drive hub 46 on the upper end of motor output shaft 22. This is accomplished by aligning the blade basket 16 along the drive axis A of the juice extractor 10, as is shown in FIG. 17. The blade basket 16 is then lowered onto drive hub 46. As the blade basket 16 is lowered, its bottom inner edges exert an inward force component which depresses spring detents 50. The blade basket is then lowered until the bottom surface 202 of the basket base 192 contacts the upper edge of the containing wall 138 of juice bowl 14. At this point, the spring-loaded detents 50 reach the groove 56 in the basket hub 52 and spring back into their original, radially extending positions. Spring detents 50 then extend into groove 56 and lock the blade basket 16 onto juicer base 12.

During the process of lowering blade basket 16 onto juicer base 12, the driven, blade basket cams 54 may initially not be properly aligned with the drive cams 48; i.e., not aligned in a manner which drive engages the two sets of cams. If this is the case, the slanted surfaces 54a on the basket cams 54 will contact the slanted surfaces 130 on the drive cams 48 and slide down these surfaces 130. This produces relative rotation between the blade basket and base housing connector 115, aligning and engaging the blade basket cams 54 with the drive cams 48.

The juice bowl lid 18 is then mounted on juice bowl 14. Initially, the lid 18 is placed on the bowl 14 with the cover 242 of juice chute 34 angularly offset from chute ledge 150. In this position, the peripheral wall 234 of the lid 18 is supported by the mounting ledge 170 on the juice bowl 14; and its inner surface abuts the mounting wall 160 of the bowl. The lid 18 is then rotated as shown by arrow G in FIG. 25 until the locking members 238 and 240 of the lid 18 contact the slanted surfaces 176 of the projections 164 and 166 on juice bowl 14.

Further rotation of the lid 18 causes several events to occur.

First, the slanted surfaces 176 exert a camming force on the locking members 238 and 240. This causes the lid 18 to be drawn down onto bowl 14.

Second, the detents 182 on the juice bowl projections 164 and 166 contact the detents 260 and 262 formed on the inner surfaces of the locking members 238 and 240. The members 238 and 240 deflect outwardly as the lid 18 is rotated, and the detents 260 and 262 slide over detents 182. As the detents 260 and 262 move past detents 182, locking members 238 and 240 restore to their original form. Detents 260, 262, and 182 then lock lid 18 onto juice bowl 14.

Third, the bottom ridges 256 and 258 on the lid locking members 238 and 240 slide under the bottom surfaces of the juice bowl projections 164 and 166. This prevents lid 18 from being lifted off juice bowl 14.

Fourth, when lid 18 is fully rotated relative to the bowl 14 into the locked position: (a) the lid's locking members 238 and 240 contact the stop members 180 on the juice bowl projections 164 and 166; (b) the side wall 248 contacts stop wall 172; and (c) the bottom indented portions 244a and 248a of the chute cover side walls 244 and 248 engage the indented portions 153a and 153b on the juice bowl chute ledge 150. Further rotation of the lid 18 relative to juice bowl 14 is thus prevented.

Fifth, in this locked position, the lid interlock segment 42 is aligned above the juice bowl interlock segment 40 such that the interlock tab 278 contacts the interlock plunger upper end 156 and displaces the plunger 155 downwardly against the bias of spring 155a. Because the interlock plunger 155 lies above the actuator 104 of interlock switch 100, the downward movement of the plunger 155 depresses the actuator and closes the interlock switch 100. Accordingly, locking the lid 18 to juice bowl 14 allows power to be applied to the motor 24 by the closing of main switch 98 if the juice bowl has theretofore been properly locked to base 12.

Additionally, when the interlock plunger 155 is depressed, its lower end 158 protrudes into juice bowl interlock segment 40. This prevents rotation of bowl 14 relative to juicer base 12 because the tab 106 covering interlock segment 40 will contact the lower plunger end 158 as long as the interlock tab 278 holds plunger 155 in its down position.

With the juice bowl 14 and blade basket 16 mounted on juicer base 12 and the lid 18 mounted on bowl 14, the juice extractor 10 is assembled and may be used to separate produce into juice and pulp. To accomplish this, power is applied to juice extractor 24 by depressing switch actuator 102 to close the main switch 98. The motor 24 is then gradually (in approximately 1 second) brought up to operating speed by the soft start portion of controller circuit 94. The drive surfaces 132 of the drive cams 48 engage the matching drive surfaces 54b of the blade basket cams 54, rotating the blade basket 16 at the same speed as the output shaft 22 of motor 24.

While the motor 24 is operating, its vibration and that generated by the rotating blade basket 16 is damped by the resilient grommets 78 and vibration absorbing feet 114. The extractor thus does not scoot or walk across the surface on which it is placed during operation.

Produce is introduced into blade basket 16 through feed tube 26. The produce contacts the blades 28 on blade disk 196. These blades 28 comminute the produce into fine pieces, which are thrown against the walls 30 of the blade basket filter 194 by centrifugal force. These fine pieces of produce are too large to pass through the holes 30a in filter 194. However, the juice therein is squeezed out by centrifugal force, passes through holes 30a, and impacts against the splash wall 136 of the juice bowl 14, leaving a residue of pulp within the blade basket 16.

As this process of separating the produce into juice and pulp continues, the centrifugal force causes the comminuted pieces of produce to move up the inner sides of the basket 16. The sizes of the filter holes 30a, the slant angle δ of the of the filter 194, and the rotational speed of motor 24 are carefully chosen to: (a) keep the pieces of produce moving up the filter at a rate which prevents an excess amount of pulp from collecting in blade basket 16; (b) allow essentially all of the juice to pass through the holes 30a; and (b) prevent more than a very small percentage of the pulp from passing through these holes.

If excessive pulp does build up on the sides of blade basket 16, the scraper/deflector 44 scrapes off the outer layer of this pulp, ensuring that: (a) it does not build up to the extent that it prevents juice from passing through holes 30a, or (b) causes blade basket 16 to become unbalanced.

Because scraper 44 is located adjacent that side of pulp chute 34 facing the direction of rotation of blade basket 16, the pulp is scraped or deflected over the annular rim 216 of filter 14 and down chute 34. Therefore, the scraper 44 ensures that pulp discharged from blade basket 16 reaches pulp chute 34.

The juice that passes through holes 30a in filter 194 and splashes against splash wall 136 flows down the sides of this wall, over the curved corner 140c of the juice bowl, along sump 140, through juice bowl outlet 142, and out spout 32. The juice is prevented from circulating within the bowl 14 by baffle 148. The baffle 148 and the barrier 146, which partially covers outlet 142, prevent juice expelled from the blade basket 16 by centrifugal force from splashing through outlet 142. Instead, the juice splashes against baffle 148 and wall 146, drips into sump 140, and flows gently down spout 32 with the rest of the juice. A container (not shown) is placed below spout 32 to collect the juice.

As discussed above, food plunger 20 is inserted into the feed tube 26 to force the produce against the blades 28 in the rotating blade basket. This accomplishes two goals: first, it keeps the user's hands away from blades 28; second, it ensures that the produce is efficiently and completely comminuted because the plunger extends to a point just (approximately 2 mm) above blades 28.

After the comminuted produce has been centrifugally separated into juice and pulp, the actuator 102 of main switch 98 is depressed to open the main switch and cut power to juice extractor motor 24. Once the blade basket 16 has stopped rotating, the lid 18 is rotated in the direction opposite that indicated by arrows G and H in FIG. 25. After an initial resistance caused by the interaction of detents 182 on Juice bowl projections 164 and 166 with the detents 260 and 262 on the lid's locking members 238 and 240, lid 18 will freely rotate. And, once the locking members 238 and 240 are rotated past the projections 164 and 166, the lid 18 may be lifted off juice bowl 14 because the bottom ridges 256 and 258 on the lid no longer contact the bottom surfaces of juice bowl projections 164 and 166.

Also, when lid 18 is rotated out of its locked position, the interlock switch 100 is opened, preventing power from reaching motor 24. In particular, this lid unlocking movement: (a) removes the interlock tab 278 from the position where it depresses the interlock plunger 155; (b) allows spring 155a to force interlock plunger 155 upwardly so that it no longer depresses the actuator of interlock switch 100; and (c) thereby allows the switch 100 to open, cutting power to motor 24 irrespective of whether main switch 98 is open or closed.

At this point, blade basket 16 may be removed. This can be difficult, however, due to the lack of fingerholds on the blade basket and the need to overcome the force exerted by these spring-loaded detents 50 extending from drive hub 46 into the groove 56 on the inner surface of the blade basket hub 52.

However, blade basket 16 can be easily removed at the same time as juice bowl 14. To accomplish this, the user simply rotates the juice bowl 14 in the direction opposite that indicated by arrows E and F in FIG. 15 (i.e., in the direction indicated by arrow B in FIG. 24). As the bowl 14 begins to rotate relative to juicer base 12, an initial resistance is felt as the vertical surface 190 of the juice bowl detents 57 and 58 press the drive hub spring detents 118 and 120 upward against the bias thereon. When detents 118 and 120 are fully raised, the detents 57, 58, and 185 on juice bowl 14 can rotate into alignment with drive hub gaps 124, 126, and 122, respectively, as shown by solid lines in FIG. 15. At this point, further rotation causes the detents 57, 58, and 185 to ride up the camming surfaces 66, thereby lifting juice bowl 14 off of base 12.

The bottom surface 202 of blade basket base 192 and the bottom surface of the annular blade basket rim 216 are spaced immediately above the top edges of the containing wall 138 and splash wall 136, respectively, of juice bowl 14 when the blade basket 16 is coupled to drive hub 46. Therefore, as juice bowl 14 is raised by cam surfaces 66, the top edges of juice bowl walls 138 and 136 contact and raise the blade basket 16 as indicated by arrows C and D in FIG. 24, disconnecting the blade basket hub from motor driven drive hub 46.

This camming action means that only a relatively small rotational force need be applied to juice bowl 14 to depress the spring-loaded detents 50 on the drive hub 46 and raise the blade basket 16 relative to juicer base 12. Once the basket 16 is raised to a level where the detents 50 are no longer seated in blade basket groove 56, the blade basket may easily be removed from juice bowl 14 or may be removed from juicer base 12 with the bowl 14 as one unit.

With lid 18, blade basket 16, and juice bowl 14 removed from juicer base 12, they may easily be cleaned. Because the juicer base 12 is isolated from the juice and pulp, it need not be cleaned after each use. In this regard, the outer wall 198 of the blade basket base 192 extends over the containing wall 138 of the juice bowl 14 (FIG. 24) when the juicer 10 is operating. This keeps juice or pulp discharged from the juice bowl away from juicer base 12 so that contamination of the base with juice or pulp is at most minimal.

From the foregoing, it will be clear to the reader that the present invention may be embodied in forms other than the one disclosed above and in the drawing without departing from the spirit or essential characteristics of the present invention. The above-described and illustrated embodiment is therefore to be considered in all respects as illustrative and not restrictive, the scope of the invention being indicated by the appended claims rather than the foregoing description. All changes that come within the meaning and scope of the claims are intended to be embraced therein.

What is claimed is:

1. A juice extractor comprising:
 a base which includes a housing and a motor with a rotatable output shaft in said housing;
 means attached to said output shaft for extracting juice from comestibles;
 cooperating drive components on said juice extracting means and said output shaft for drive-connecting the juice extracting means to the output shaft;
 a juice bowl for collecting extracted juice, said juice bowl being configured to receive the juice extracting means; and
 means for locking said juice bowl to the housing of said base, said locking means having cooperating coupling elements incorporated in the housing and the juice bowl and being so constructed that: (a) when said juice bowl is rotated in one direction relative to said base, the cooperating coupling elements are engaged and lock the juice bowl to the base; and (b) when the juice bowl is rotated in the opposite direction relative to the base, the cooperating coupling elements are disengaged and the juice bowl and juice extracting means are cammed upwardly and lifted from the base to disengage said cooperating drive components and allow the juice bowl and juice extracting means by the relative rotational movement between the drive components on said juice extracting means and the drive components on the output shaft to be removed from the base.

2. A juice extractor which comprises:
 a base which includes a housing and a motor with a rotatable, vertically extending output shaft in said housing;
 juice extracting means driven by said output shaft;
 a base-supported juice bowl with an open upper end for collecting extracted juice, said bowl housing said juice extracting means and being rotatable relative to the base to lock it to said base;
 a juice bowl-supported cover which is rotatable relative to the juice bowl to lock it to said bowl and thereby deny access to the juice extracting means in the bowl; and
 means for controlling the operation of the motor which includes an interlock having: (a) cooperating segments incorporated in the housing of the juice extractor base, the juice bowl, and the juice bowl cover which are alignable in a vertical array with one segment above the next and keep said motor from being turned on unless said interlock segments have been aligned in said array by rotating the juice bowl and the juice bowl cover as aforesaid to lock the juice bowl to the base and the juice bowl cover to the juice bowl; and (b) an interlock switch which is disposed in the interlock segment incorporated in the juice extractor base and is closed by the aforesaid alignment of the interlock segments; and
 a main on-off switch which is connected in parallel with the interlock switch and is disposed in the interlock segment incorporated in the juice extractor base.

3. A juice extractor comprising:
 a base which includes a housing and a motor with a rotatable output shaft in said housing;
 means attached to said output shaft for extracting juice from comestibles;
 cooperating drive components on said juice extracting means and said output shaft for drive-connecting the juice extracting means to the output shaft;
 a juice bowl for collecting extracted juice, said juice bowl being configured to receive the juice extracting means; and
 means for locking said juice bowl to the housing of said base, said locking means having cooperating coupling elements incorporated in the housing and the juice bowl and being so constructed that: (a) when said juice bowl is rotated in one direction relative to said base, the cooperating coupling elements are engaged and lock the juice bowl to the base; and (b) when the juice bowl is rotated in the opposite direction relative to the base, the cooperating coupling elements are disengaged and the juice bowl and juice extracting means are lifted from the base to disengage said cooperating drive components and allow the juice bowl and juice extracting means to be removed from the base;
 said juice bowl having an inner wall; and
 the locking means comprising: a detent extending inwardly from said inner wall; means on the housing of the juice extractor base for trapping said detent when said juice bowl is rotated in said one direction; and a cam associated with said housing and having a surface so configured that, when said juice bowl is rotated in said opposite direction, there is contact between said cam surface and said detent which displaces said juice bowl away from said base as aforesaid.

4. A juice extractor which comprises:
 a base which includes a housing and a motor with a rotatable, vertically extending output shaft in said housing;
 a juice extracting means driven by said output shaft;
 a base-supported juice bowl with an open upper end for collecting extracted juice, said bowl housing said juice extracting means and being rotatable relative to the base to lock it to said base;
 a juice bowl-supported cover which is rotatable relative to the juice bowl to lock it to said bowl and thereby deny access to the juice extracting means in the bowl; and
 means for controlling the operation of the motor which includes an interlock having cooperating and alignable segments incorporated in the housing of the juice extractor base, the juice bowl, and the juice bowl cover which keeps said motor from being turned on unless said interlock segments have been aligned by rotating the juice bowl and the juice bowl cover as aforesaid to lock the juice bowl and the juice bowl cover to the juice bowl;
 the interlock segment of the juice extractor base comprising a biased open switch which must be closed to turn the motor on;
 the juice bowl segment of the interlock including an actuator which is displaceable to close said switch only when the juice bowl is locked to the juice extractor base and the base and juice bowl segments of the interlock are aligned; and
 the juice bowl cover segment of the interlock including means operable only when the cover is locked to the juice bowl and the cover and juice bowl segments of the interlock are aligned to displace the actuator in the juice bowl segment of the interlock to an extent which will result in the interlock switch being closed.

5. A juice extractor as defined in claim 4 in which the interlock includes means so biasing said interlock switch actuator away from the interlock switch that the actuator will be biased toward an initial position that facilitates movement of the juice bowl relative to the juice extractor base when the juice bowl is rotated in a locking direction.

* * * * *

UNITED STATES PATENT AND TRADEMARK OFFICE
CERTIFICATE OF CORRECTION

PATENT NO. : 5,355,784
DATED : October 18, 1994
INVENTOR(S) : Eric Franklin, et al It is certified that error appears in the above-indentified patent and that said Letters Patent is hereby corrected as shown below:

```
Column  2, line 44, change "δ" to --∂--
Column 11, line 39, change "δ" to --∂--
Column 11, line 43, change "δ" to --∂--
Column 11, line 50, change "FIGS. 9-23" to
--FIGS. 19-23--
Column 12, line 40, change "δ" to --∂--
Column 15, line 16, change "δ" to --∂--
```

Signed and Sealed this

Twenty-ninth Day of August, 1995

*Attest:*

BRUCE LEHMAN

*Attesting Officer*  *Commissioner of Patents and Trademarks*